US012779560B2

(12) United States Patent
Vandenbush et al.

(10) Patent No.: US 12,779,560 B2
(45) Date of Patent: Nov. 3, 2026

(54) CUT-OFF SAW

(71) Applicant: MILWAUKEE ELECTRIC TOOL CORPORATION, Brookfield, WI (US)

(72) Inventors: Helton F. Vandenbush, Belgium, WI (US); Jonathan E. Schmitz, Wauwatosa, WI (US); Katie M. Cameron, Milwaukee, WI (US); Daniel R. Rumler, Milwaukee, WI (US); Gregory M. Sember, Burlington, WI (US); Andrew J. Paskov, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 163 days.

(21) Appl. No.: 18/208,950

(22) Filed: Jun. 13, 2023

(65) Prior Publication Data

US 2023/0398614 A1 Dec. 14, 2023

Related U.S. Application Data

(60) Provisional application No. 63/408,552, filed on Sep. 21, 2022, provisional application No. 63/351,487, filed on Jun. 13, 2022.

(51) Int. Cl.

| | |
|---|---|
| ***B23D 45/16*** | (2006.01) |
| *B25F 5/02* | (2006.01) |
| *B28D 1/22* | (2006.01) |

(52) U.S. Cl.

CPC ................ *B23D 45/16* (2013.01); *B25F 5/02* (2013.01); *B28D 1/228* (2013.01)

(58) Field of Classification Search

CPC ........ B23D 45/16; B28D 1/228; B28D 5/022; B28D 1/02; B28D 1/04; B28D 1/042;

(Continued)

(56) References Cited

U.S. PATENT DOCUMENTS

| | | | | |
|---|---|---|---|---|
| 5,466,183 A * | 11/1995 | Kirn | .......................... | B25F 5/02 30/518 |
| D533,757 S * | 12/2006 | Arvidsson | ........................ | D8/66 |

(Continued)

FOREIGN PATENT DOCUMENTS

| | | | | |
|---|---|---|---|---|
| GB | 2495208 A | 4/2013 | | |
| GB | 2588831 A * | 5/2021 | ................ | B25F 5/02 |

(Continued)

OTHER PUBLICATIONS

Partial European Search Report for Application No. 23178970.2 dated Nov. 21, 2023 (14 pages).

*Primary Examiner* — Evan H Macfarlane

(74) *Attorney, Agent, or Firm* — Michael Best & Friedrich LLP

(57) ABSTRACT

A power tool includes a housing, a trigger, a motor supported within the housing, a saw blade interconnected to the housing by a support arm and drivably coupled to the motor, a main handle integrally formed with the housing, an auxiliary handle coupled to the housing and disposed between the saw blade and the main handle, and a battery receptacle defined by the housing and positioned beneath the main handle. The battery receptacle is configured to receive a battery pack to supply electrical current to the motor. The power tool further includes a splash guard integrally formed with the housing and positioned between the battery receptacle and the saw blade.

10 Claims, 29 Drawing Sheets

(58) Field of Classification Search
CPC ... B28D 1/045; B25F 5/02–029; B24B 23/00; B24B 23/005; B24B 23/02; B24B 23/022; B24B 23/028; B27B 9/04
See application file for complete search history.

(56) References Cited

U.S. PATENT DOCUMENTS

| | | | | |
|---|---|---|---|---|
| 8,006,777 | B2 * | 8/2011 | Meixner | B27B 9/02 173/171 |
| 8,695,224 | B2 | 4/2014 | Gehret | |
| 9,630,343 | B2 | 4/2017 | Vikholm et al. | |
| 9,656,336 | B2 | 5/2017 | Petersson et al. | |
| 9,975,273 | B2 | 5/2018 | Vikholm et al. | |
| 10,486,250 | B2 | 11/2019 | Petersson et al. | |
| 10,695,848 | B2 | 6/2020 | Gehret | |
| 2009/0283286 | A1 * | 11/2009 | Hoffmann | B24B 21/20 30/388 |
| 2011/0308831 | A1 * | 12/2011 | Martinsson | H01M 50/213 173/217 |
| 2014/0245622 | A1 | 9/2014 | Gehret | |
| 2017/0120436 | A1 | 5/2017 | Rudolph | |
| 2018/0369939 | A1 | 12/2018 | Zimmerman et al. | |
| 2020/0376705 | A1 | 12/2020 | Fukinuki et al. | |
| 2021/0078203 | A1 | 3/2021 | Sumi et al. | |
| 2021/0252617 | A1 * | 8/2021 | Obermann | B23D 45/16 |
| 2023/0330893 | A1 * | 10/2023 | Sumi | B23D 45/16 |
| 2023/0396056 | A1 * | 12/2023 | Rosén | H02P 3/22 |
| 2023/0415324 | A1 * | 12/2023 | Greitmann | B25F 5/008 |
| 2025/0087949 | A1 * | 3/2025 | Kanno | H01M 50/583 |

FOREIGN PATENT DOCUMENTS

| | | | |
|---|---|---|---|
| WO | 2020246928 | A1 | 12/2020 |
| WO | 2021104723 | A1 | 6/2021 |
| WO | 2021107827 | A1 | 6/2021 |
| WO | 2021107842 | A1 | 6/2021 |
| WO | 2021107843 | A1 | 6/2021 |
| WO | 2021107844 | A1 | 6/2021 |
| WO | 2021107845 | A1 | 6/2021 |
| WO | 2021107846 | A1 | 6/2021 |
| WO | 2021107847 | A1 | 6/2021 |
| WO | 2021107848 | A1 | 6/2021 |
| WO | 2021109603 | A1 | 6/2021 |

* cited by examiner

CUT-OFF SAW

CROSS-REFERENCE TO RELATED APPLICATIONS

This application claims priority to U.S. Provisional Patent Application No. 63/408,552, filed Sep. 21, 2022, and U.S. Provisional Patent Application No. 63/351,487, filed Jun. 13, 2022, the entire contents of each of which are incorporated herein by reference.

FIELD OF THE INVENTION

The present invention relates to cut-off saws, and more particularly to battery powered cut-off saws.

BACKGROUND OF THE INVENTION

Power tools such as, cut-off saws, generally have many applications. Cut-off saw can be held directly by a user for operation or supported by a cart. During operation, the cut-off saw can make precise cuts into a floor surface such as concrete or asphalt. The cut-off saw can also cut rebar, metal pipe, PVC pipe, and a wall surface.

SUMMARY OF THE INVENTION

The present invention provides, in one aspect, a power tool including a housing, a trigger, a motor supported within the housing, a saw blade interconnected to the housing by a support arm and drivably coupled to the motor, a main handle integrally formed with the housing, an auxiliary handle coupled to the housing and disposed between the saw blade and the main handle, and a battery receptacle defined by the housing and positioned beneath the main handle. The battery receptacle is configured to receive a battery pack to supply electrical current to the motor. The power tool further includes a splash guard integrally formed with the housing and positioned between the battery receptacle and the saw blade.

The present invention provides, in another aspect, a power tool including a housing, a motor supported within the housing, a saw blade interconnected to the housing by a support arm and drivably coupled to the motor, and a main handle coupled to the housing. The main handle having a front end proximate the saw blade and an opposite rear end. The power tool further includes an auxiliary handle disposed between the saw blade and the main handle, and a carry strap removably coupled to the main handle at a first attachment point positioned at the rear end of the main handle and a second attachment point positioned on the support arm.

The present invention provides, in another aspect, a power tool configured to be supported by a cart including a frame, a mount assembly to secure the power tool to the frame, and a remote actuation system having a first electrical connector, a cart control unit, and a wire configured to interconnect the first electrical connector and the cart control unit. The remote actuation system is operable to activate and deactivate the power tool when the power tool is secured to the frame. The power tool includes a housing, a motor supported within the housing, a saw blade drivably coupled to the motor, a trigger, a saw control unit supported within the housing and configured to activate and deactivate the motor in response to a first input control signal from the trigger, and a second electrical connector in communication with the saw control unit and configured to electrically connect to the first electrical connector of the cart. A second input control signal is transmitted from the cart control unit to the saw control unit by the wire, via the first and second electrical connectors, to selectively activate and vary a rotational speed of the motor and the saw blade.

The present invention provides, in yet another aspect, a power tool including a housing, a trigger, a motor supported within the housing, a saw blade interconnected to the housing by a support arm and drivably coupled to the motor, a battery receptacle configured to receive a battery pack to supply electrical current to the motor, and a controller connected to the trigger, the motor, and the battery receptacle. The controller is configured to drive the motor in response to actuation of the trigger, disengage, in response to release of the trigger, driving of the motor to allow the motor to coast for a first predetermined time period, and brake, in response to the first predetermined time period being satisfied, the motor.

The present invention provides, in another aspect, a cut-off saw including a housing, a motor supported within the housing, a saw blade interconnected to the housing by a support arm and drivably coupled to the motor, and a main handle coupled to the housing. The main handle having a trigger and a front end proximate the saw blade and opposite the rear end. The cut-off saw further includes an auxiliary handle disposed between the saw blade and the main handle and an electronic control unit supported within the housing. The electronic control unit is configured to activate and deactivate the motor in response to an input control signal from the trigger. The electronic control unit includes a heat sink having a plurality of fins defining channels between adjacent fins, such that a first airflow path flows through the channels during operation of the motor. Each of the fins has an undulated surface.

Figure 1:
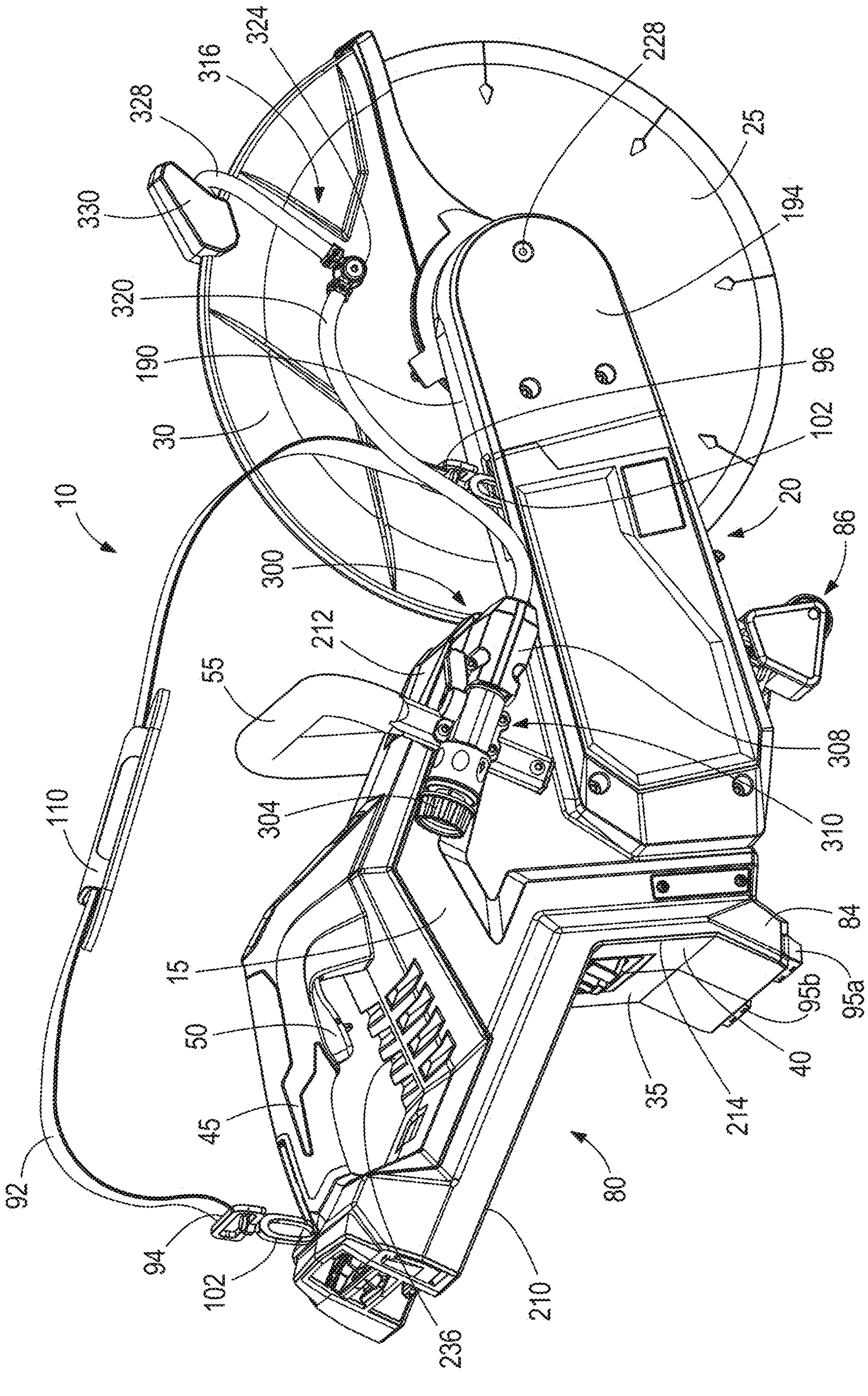
FIG. 1 is a side perspective view of a cut-off saw according to an embodiment of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-4 illustrate a handheld power tool 10, which is a cut-off saw in the illustrated embodiment. The saw 10 includes a housing 15, a support arm 20 coupled to and extending from the housing 15, a cutting wheel 25 carried by the support arm 20, and a guard 30 covering a portion of the circumference of the cutting wheel 25. The cutting wheel 25 can be a blade, an abrasive disk, or any other rotatable element capable of removing material from a workpiece. In the illustrated embodiment, the cutting wheel 25 has a diameter greater than 9 inches and is preferably 14 inches in diameter. In other embodiments, the cutting wheel 25 can be between about 10 inches and about 16 inches in diameter.

The illustrated housing 15 is a clamshell housing having left and right cooperating halves 35, 40. A first or rear handle 45 extends from a rear portion of the housing 15 in a direction generally opposite the support arm 20. A power button 48 (FIG. 9) and a trigger 50 for operating the saw 10 are located on the rear handle 45. In the illustrated embodiment, the saw 10 also includes a second or forward handle 55 that is fixed to the housing 15 and wraps around an upper portion of the housing 15. The forward handle 55 and the rear handle 45 provide grip areas to facilitate two-handed operation of the saw 10.

Figure 5:
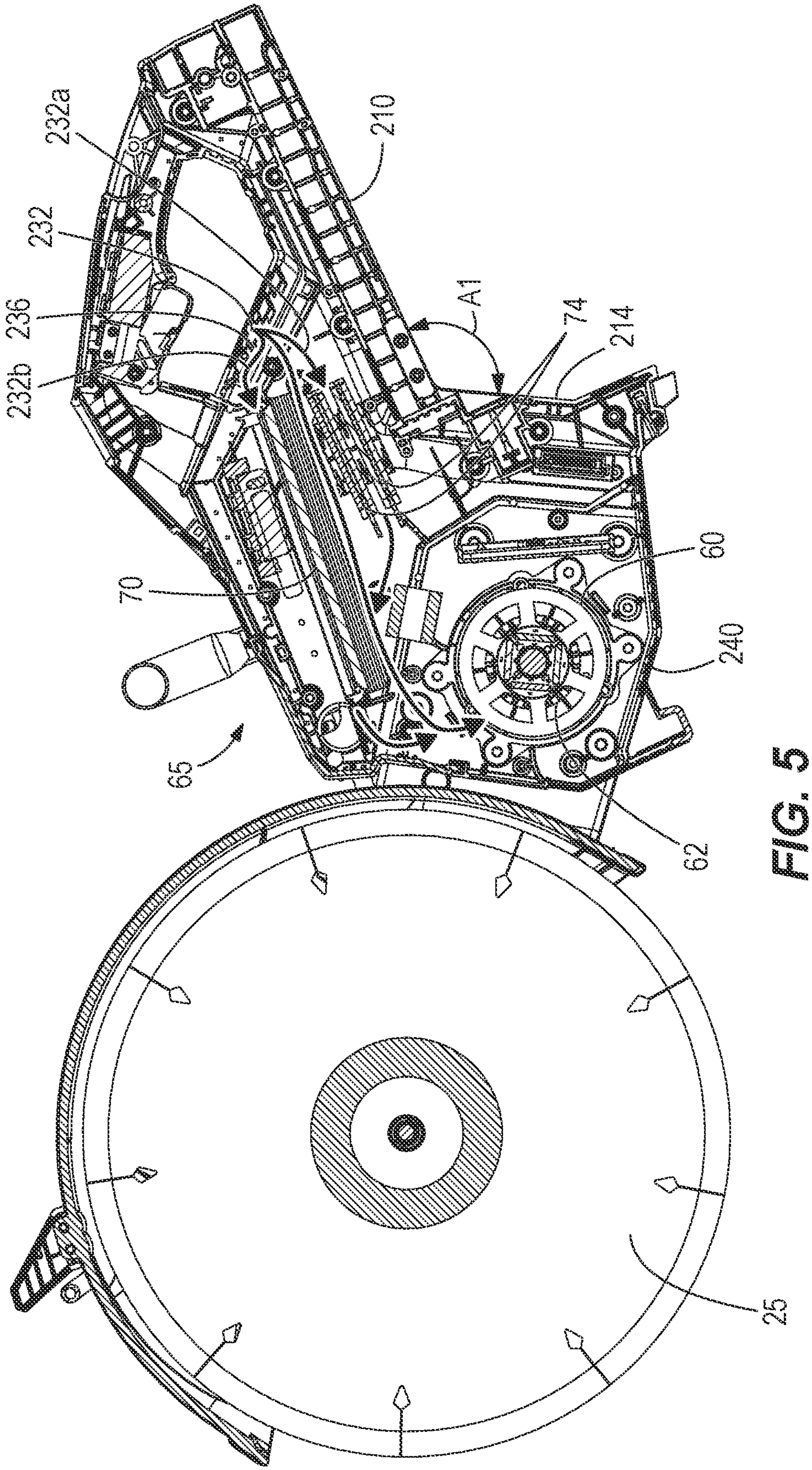
FIG. 5 is a cross-sectional view of the cut-off saw of FIG. 1 with portions removed.
Figure 6A:
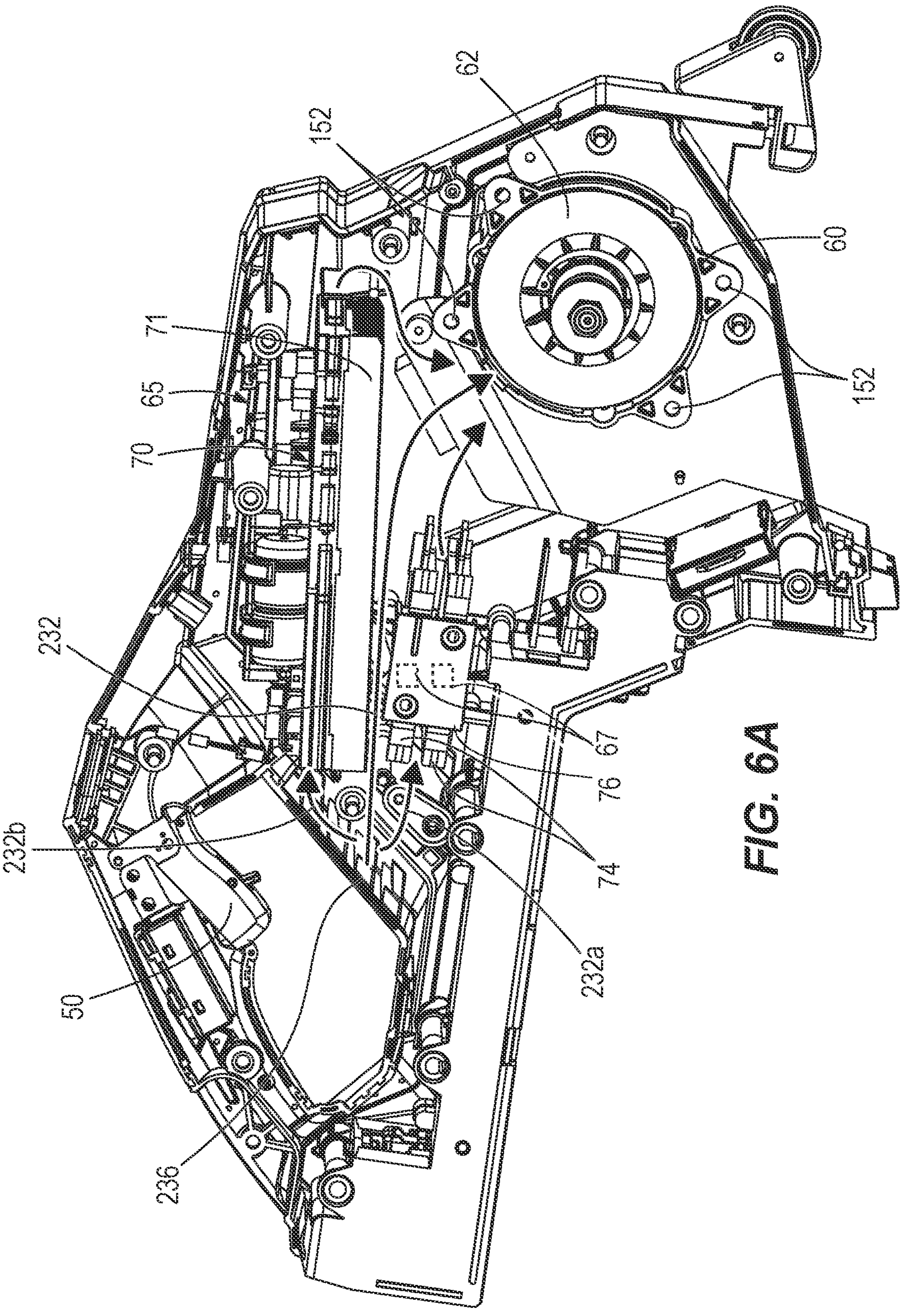
FIG. 6A is an opposite, cross-sectional view of the cut-off saw of FIG. 5 with portions removed.
Figure 6B:
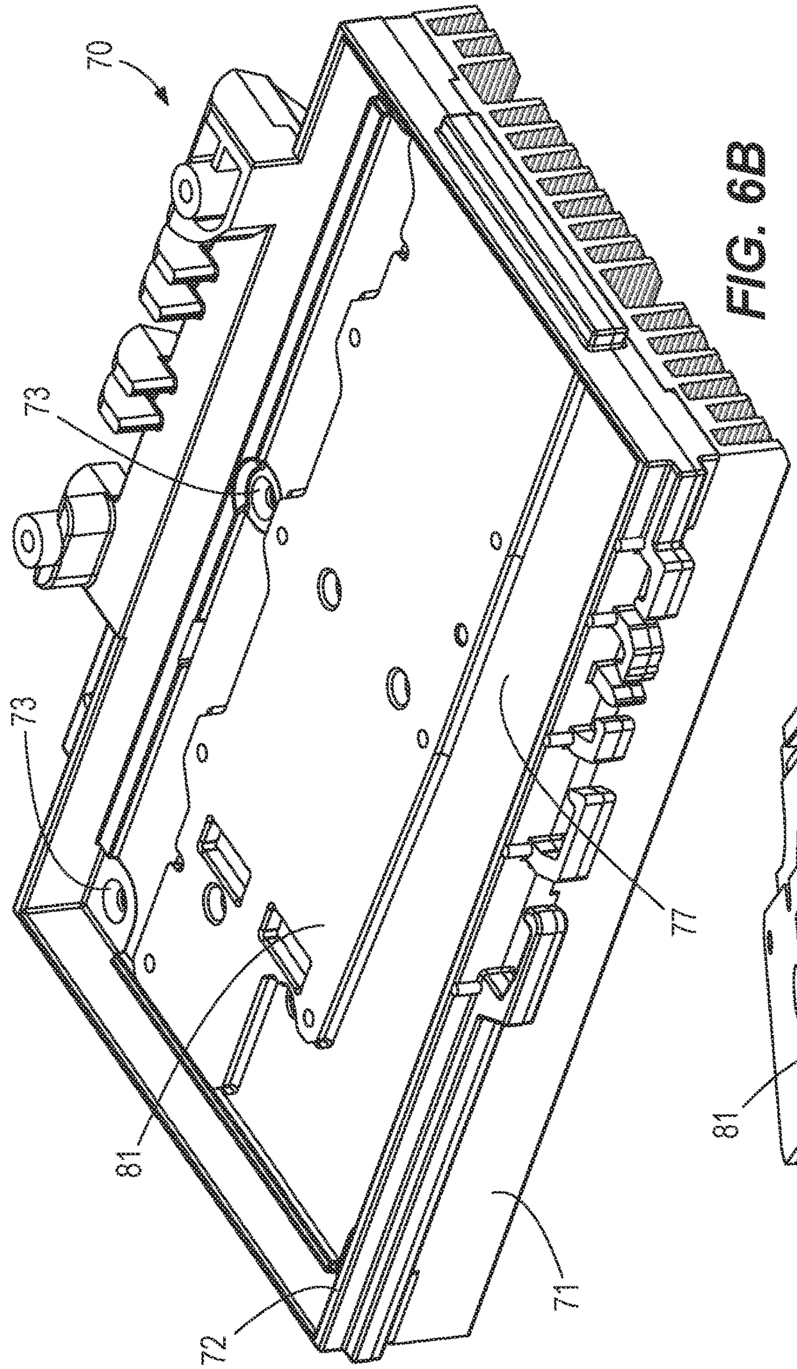
FIG. 6B is a perspective view of a potting boat assembly in the cut-off saw of FIG. 6A.

With reference to FIGS. 5, 6A, and 6B the saw 10 further includes a motor housing 60 formed within the housing 15 at a front, lower portion of the housing 15. An electric motor 62 is positioned in the motor housing 60. The motor 62 is preferably a brushless direct-current ("BLDC") motor. Operation of the motor 62 is governed by an electronic control unit 65 including a printed circuit board ("PCB") housed within a potting boat assembly 70 and at least two standalone resistors 67, not on the PCB, positioned below the potting boat assembly 70. The PCB includes FETs (not shown) that are mounted to the top of the PCB, which is positioned within the potting boat assembly 70 and covered with potting material (e.g., an epoxy resin). The resistors 67 are mounted to respective heat sinks 74, which are spaced from each other and connected by a bracket 76, which also functions as a baffle as explained in further detail below.

FIG. 6B illustrates the potting boat assembly 70 without the PCB or potting material therein. The potting boat assembly 70 includes a heat sink 71 and a frame 72 attached to the heat sink 71. In some embodiments, the heat sink 71 can be fixed to the frame 72 by a plurality of fasteners (not shown) received within a first set of mounting holes 73 arranged along an inner edge of the frame 72 and a second set of mounting holes 75 (FIG. 6C) formed in a top surface 77 of the heat sink 71. The frame 72 is formed of a plastic material while the heat sink 71 is formed of a metal alloy, such as Aluminum 6063. Aluminum 6063 provides the heat sink 71 with a thermal conductivity of 218 W/m-K, which is higher than other Aluminum alloys (e.g., Aluminum A380, which has a thermal conductivity of 109 W/m-K) that are conventionally used for heat sinks. As such, the increased thermal conductivity of the heat sink 71 more efficiently cools the heat-generating electronic components on the PCB.

Figure 6C:
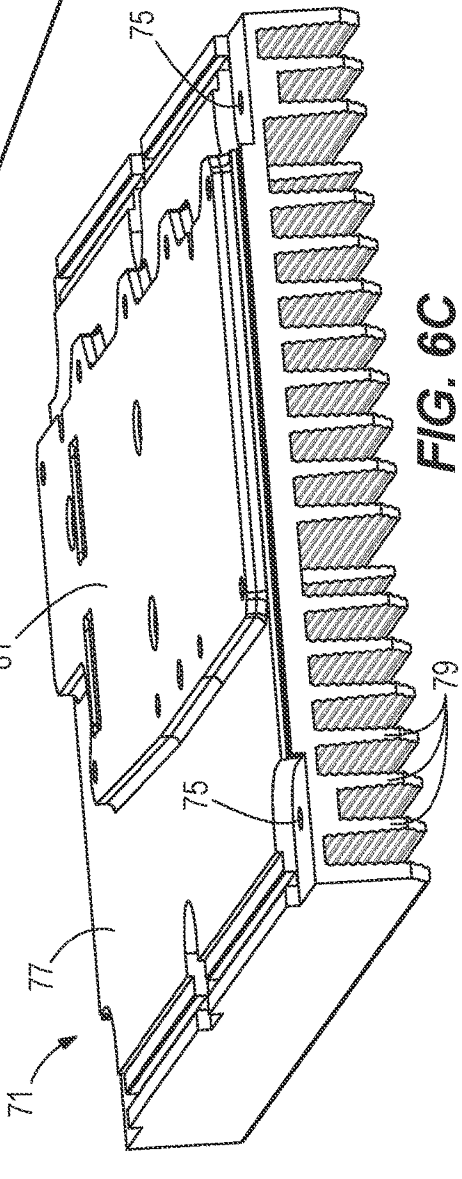
FIG. 6C is a top perspective view of a heat sink of the potting boat assembly of FIG. 6B.
Figure 6D:
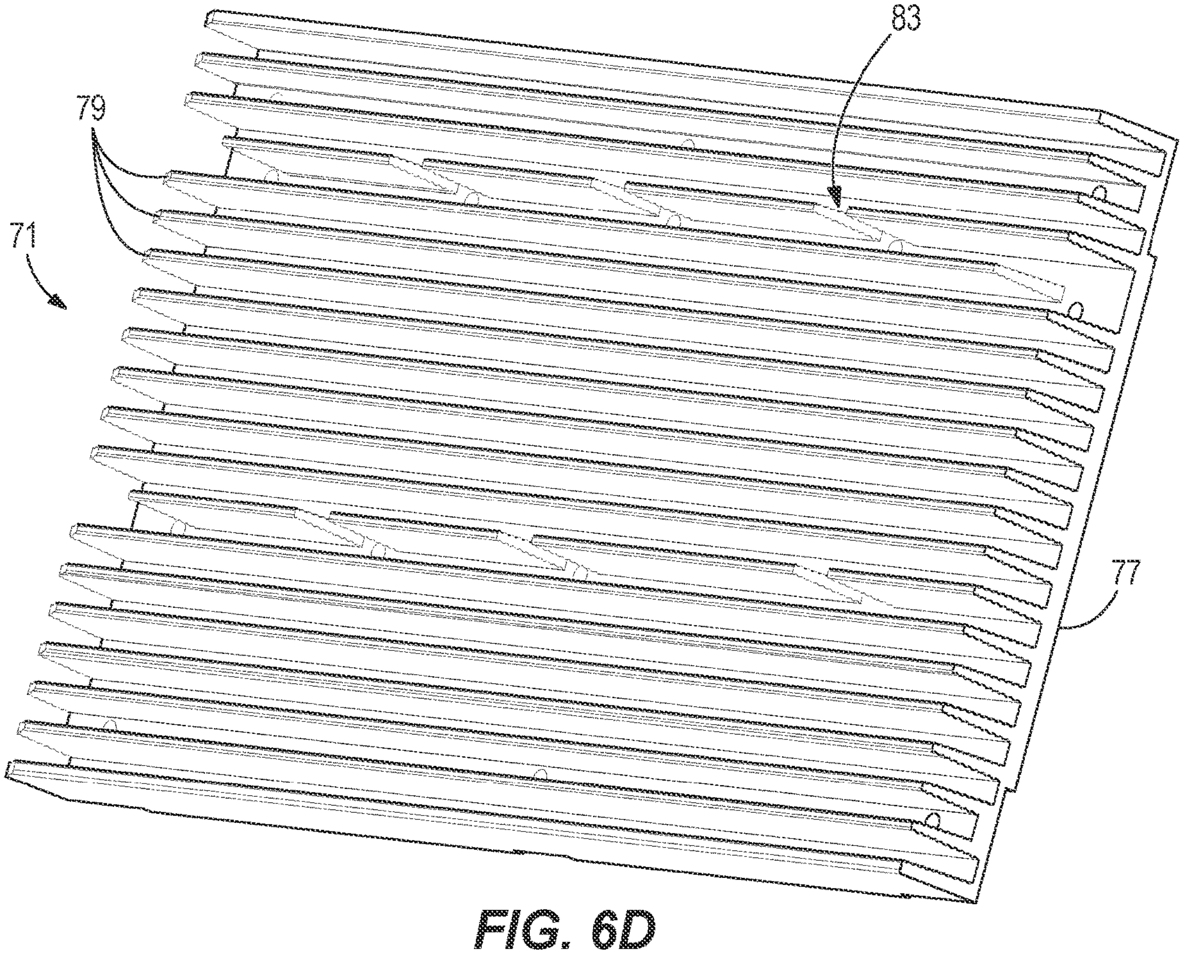
FIG. 6D is a bottom perspective view of the heat sink of FIG. 6C.

With reference to FIGS. 6B-6D, the top surface 77 of the heat sink 71 further includes a platform 81 that is raised above the surrounding portions of the top surface 77. The platform 81 is configured to support the PCB as it is received within the potting boat assembly 70. The heat sink 71 also includes a plurality of parallel fins 79 extending along an opposite, bottom surface of the heat sink 71 along the length of the heat sink 71. In some embodiments, the heat sink 71 includes 20 rows of fins 79. As illustrated in FIG. 6D, some of the fins 79 extend along the entire length of the heat sink 71, whereas other fins 79 include gaps 83 along the length thereof to create multiple discrete fins 79 within a single row.

Figure 6E:
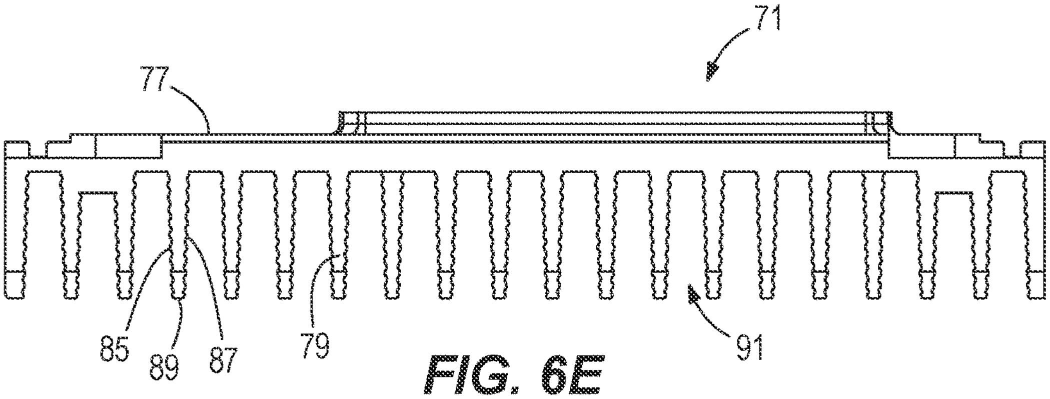
FIG. 6E is an end view of a portion of the heat sink of FIG. 6C.

With reference to FIG. 6E, each fin 79 includes a first side 85, a second side 87 spaced from the first side 85, and a bottom surface 89 extending between the sides 85, 87. The first and second sides 85, 87 are undulated, thereby defining alternating peaks and valleys, instead of being flat. In contrast to fins having flat side surfaces, the undulated fins 79 are provided with an increased surface area through which heat transfer may occur. Each fin 79 of the illustrated embodiment has 6% more surface area than a fin with flat side surfaces. As such, the heat sink 71 has a total surface area that is 6% more than a traditional heat sink with flat-sided fins, since the undulated fins 79 only add more surface area to each fin 79 rather than the entire heat sink 71.

Referring to FIGS. 1-4, the illustrated saw 10 is a cordless electric saw and includes a battery or battery pack 78 (FIGS. 16 and 17) that provides electrical current to the motor 62. The battery pack 78 is removably coupled to a battery receptacle 80, which is located on the lower portion of the housing 15 in the illustrated embodiment (FIG. 1). As such, the rear handle 45 is positioned above the battery receptacle 80 when the battery pack 78 is coupled to the receptacle 80. In other embodiments, the saw 10 may be a corded electric saw configured to receive power from a wall outlet or other remote power source. In another embodiment, the saw 10 is configured to be supported by a cart (not shown), as discussed herein below, instead of being hand-carried.

The battery pack 78 is a power tool battery pack and includes a battery housing 82 (FIGS. 16 and 17) and a plurality of rechargeable battery cells (not shown) disposed within the battery housing 82. The battery cells are lithium-based battery cells but can alternatively have any other suitable chemistry. The battery pack 78 has a nominal output voltage of about 80V. The battery pack 78 can also have a different nominal voltage, such as, for example, 36V, 40V, 72V, between 36V and about 80V, or greater than 40V.

With continued reference to FIGS. 1-4, the housing 15 of the saw 10 includes a splash guard 84 integrally formed along the rear, lower portion of the housing 15. The splash guard 84 extends in a direction generally opposite the support arm 20 and partially defines the battery receptacle 80, such that the splash guard 84 prevents debris, dust, and fluid from operation of the saw 10 from contacting the battery pack 78 when attached to the receptacle 80.

Figure 4:
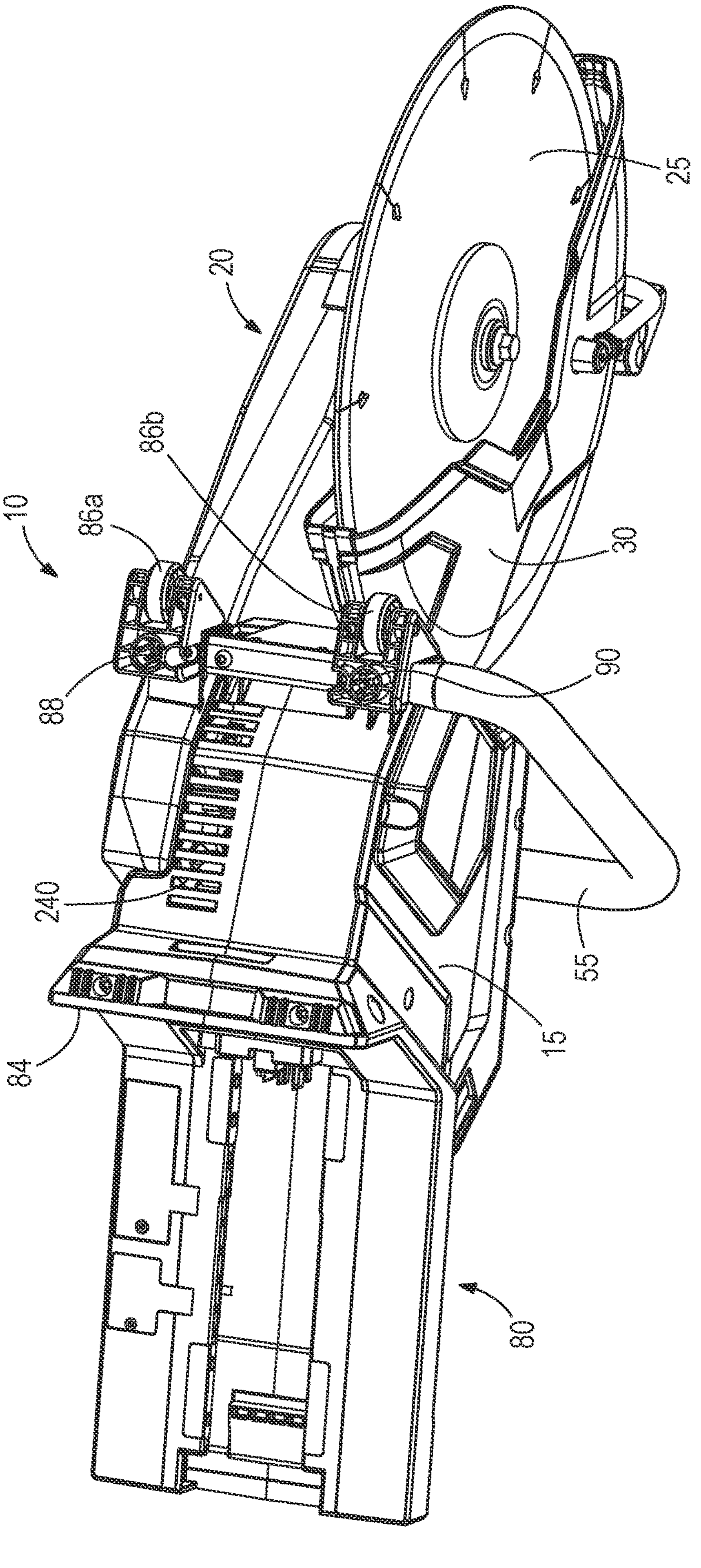
FIG. 4 is a bottom perspective view of the cut-off saw of FIG. 1.

The saw 10 further includes a pair of wheels 86*a*, 86*b*, a first foot 95*a*, and a second foot 95*b*. The wheels 86*a*, 86*b* are proximate the front portion of the housing 15 rotatably supported by respective first and second wheel mounts 88, 90 (FIG. 4). One wheel 86*a* is coupled to the support arm 20 by the first wheel mount 88, which is integrally formed with the support arm 20. The other wheel 86*b* is coupled to the left half 35 of the housing 15 by the second wheel mount 90, with the forward handle 55 disposed between the second wheel mount 90 and the left half 35 of the housing 15. The first foot 95*a* and the second foot 95*b* extend from the splash guard 84. As such, the feet 95*a*, 95*b* and the pair of wheels 86*a*, 86*b* are configured to support the saw 10 along a surface.

Figure 9:
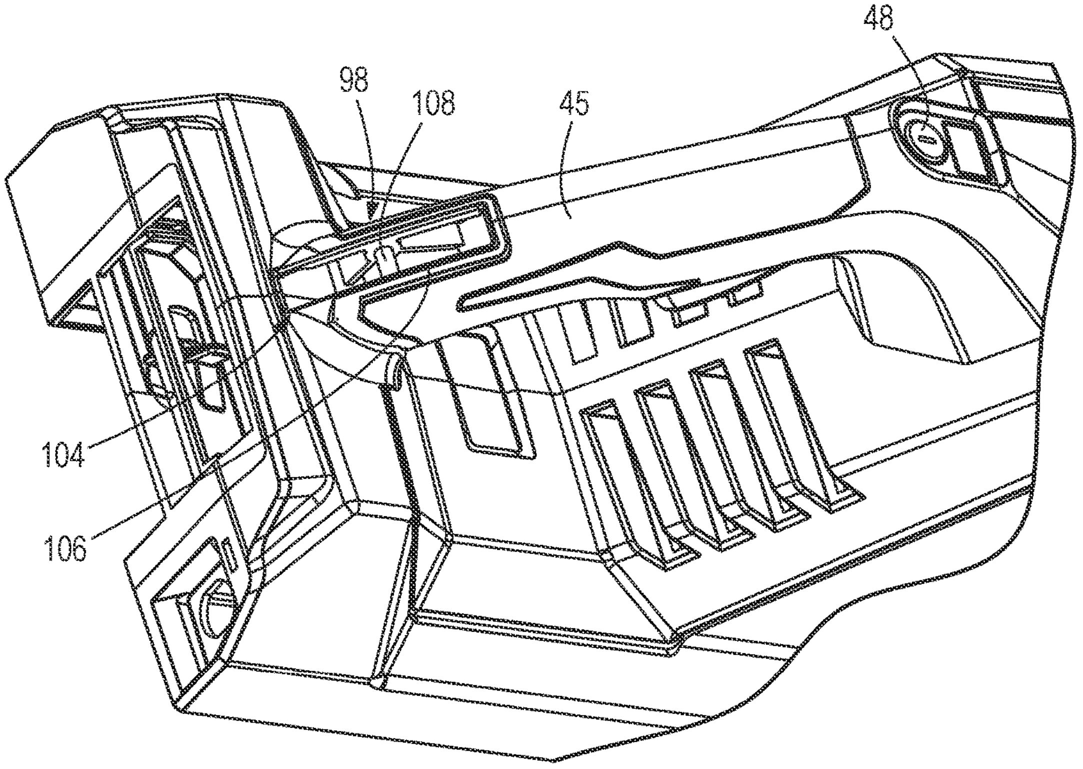
FIG. 9 is an enlarged view of the cut-off saw of FIG. 1, illustrating a rear handle of the saw.
Figure 10:
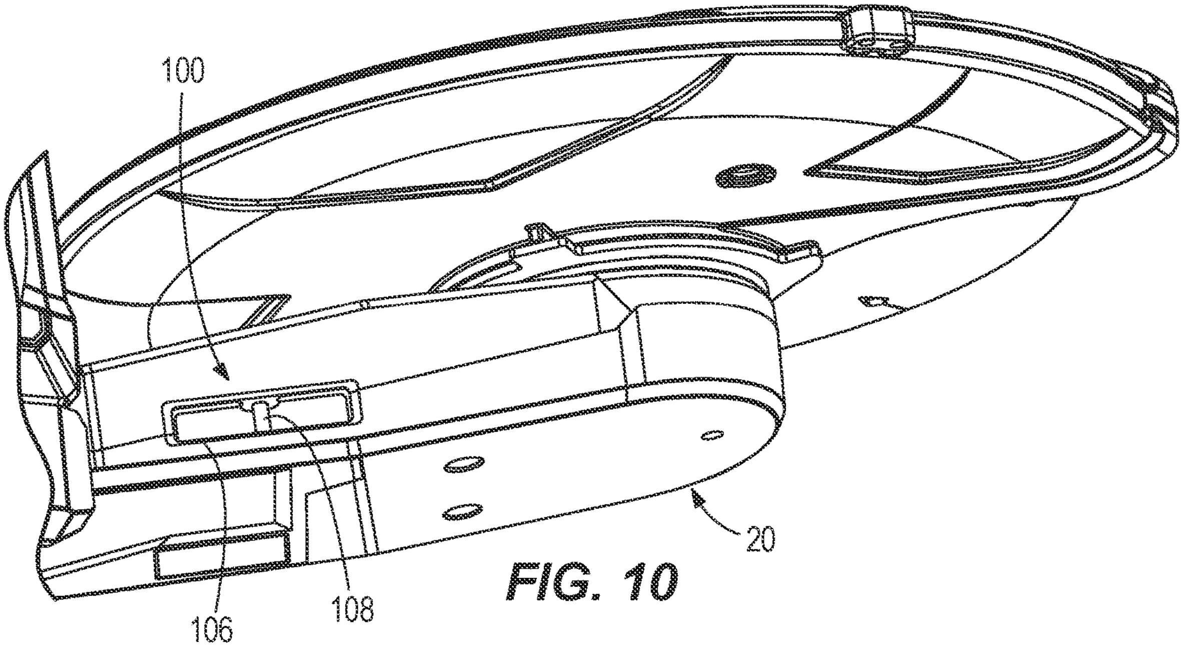
FIG. 10 is an enlarged view of the cut-off saw of FIG. 1, illustrating a portion of the support arm.

With reference to FIGS. 1, 9, and 10, the saw 10 further includes a carry strap 92 configured to be removably coupled to the saw 10 and worn along a user's shoulder to support the weight of the saw 10 during transportation of the saw 10. The carry strap 92 includes a first end 94 and a second end 96 configured to be removably coupled to the saw 10 at a first attachment point 98 (FIG. 9) and a second attachment point 100 (FIG. 10), respectively. The first end 94 and the second end 96 of the carry strap 92 each have a securing member 102 (e.g., a clip or latch, FIG. 1) configured to latch onto the first attachment point 98 and the second attachment point 100, respectively, of the saw 10. The first attachment point 98 is positioned at a rear end 104 of the rear handle 45 and the second attachment point 100 is positioned along the support arm 20. A recess 106 having a bar 108 is disposed at both the first attachment point 98 and the second attachment point 100, so that the securing members 102 at the first end 94 and the second end 96 of the carry strap 92 can be attached to the saw 10. The carry strap 92 further includes a shoulder pad 110 that is slidable between the first end 94 and the second end 96 of the carry strap 92 (FIG. 1). The shoulder pad 110 of the carry strap 92 allows the user to comfortably wear the carry strap 92 when transporting the saw 10.

Figure 7A:
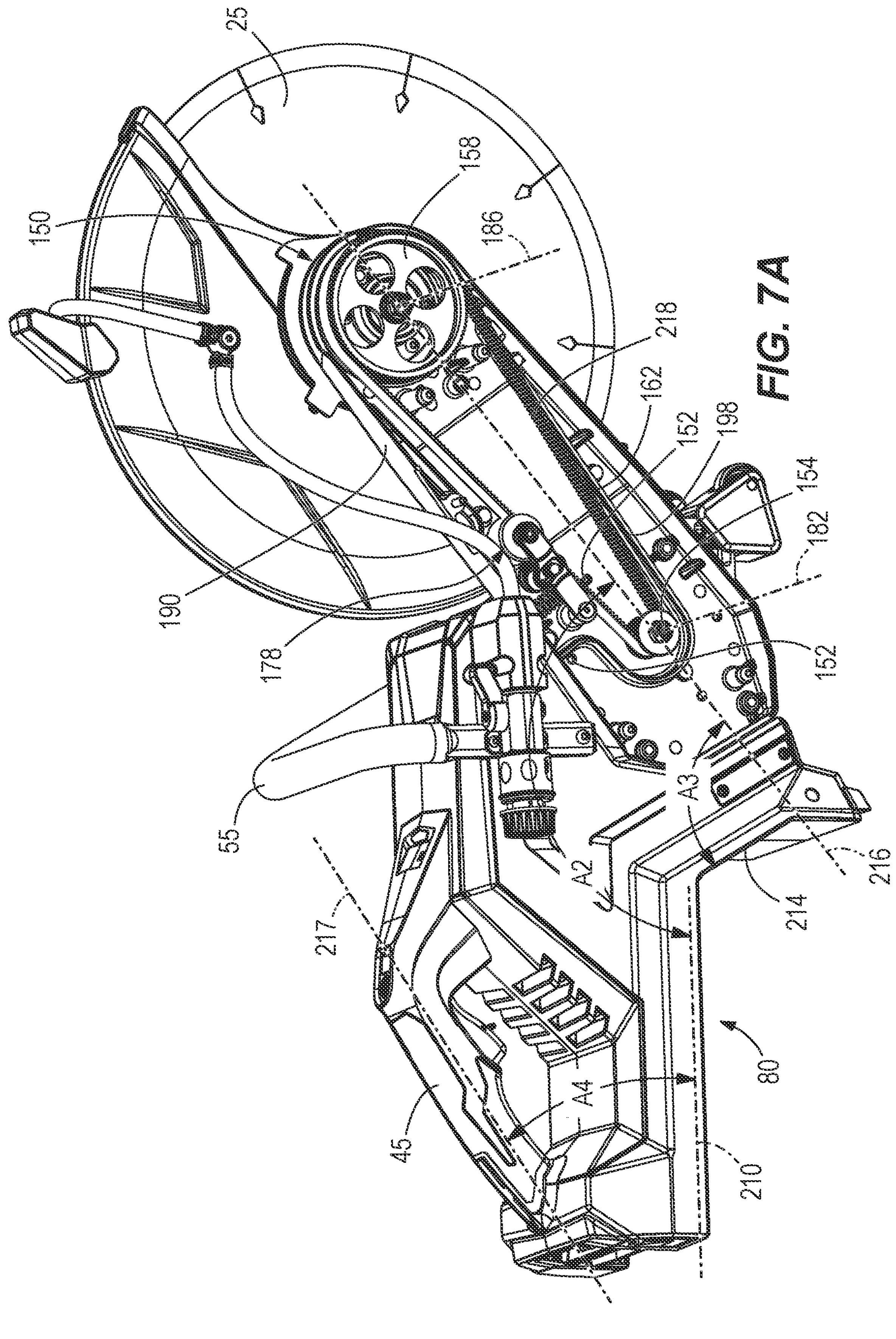
FIG. 7A is a perspective view of the cut-off saw of FIG. 1, illustrating an interior of a support arm.
Figure 8:
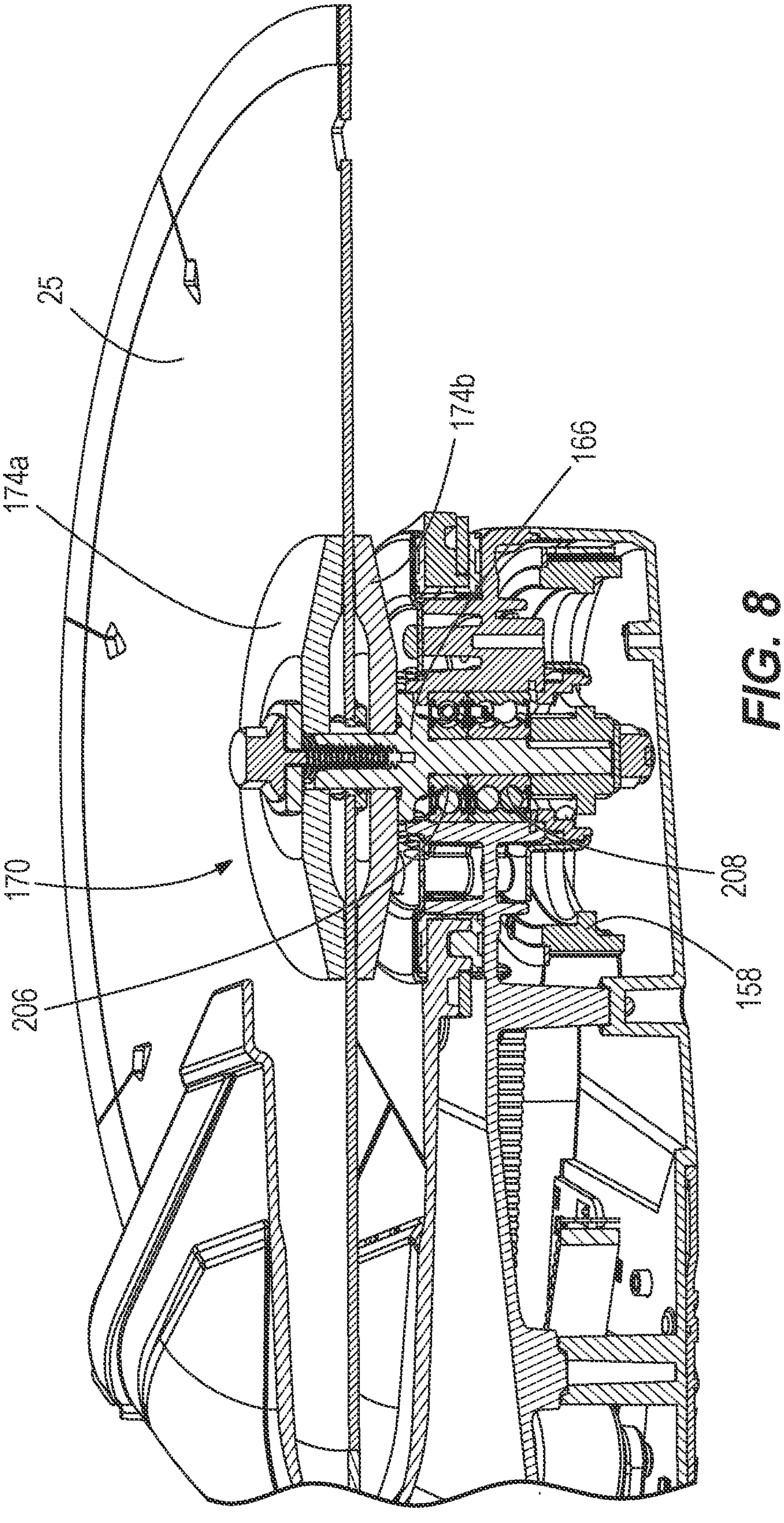
FIG. 8 is a cross-sectional view of the cut-off saw of FIG. 1 taken along line 8-8 in FIG. 2, exposing the interior of the support arm.

With reference to FIGS. 7A and 8, the saw 10 includes a drive assembly 150 for transmitting torque from the motor 62 to the cutting wheel 25. The drive assembly 150 includes a drive pulley 154 fixed to an output shaft (not shown) of the motor 62, a driven pulley 158 connected to the drive pulley 154 by a belt 162, a spindle 166 fixed to the driven pulley 158, and a clamp assembly 170 coupled to the spindle 166. In some embodiments, a clutch mechanism may be provided between the output shaft and the drive pulley 154 to selectively interrupt torque transfer between the output shaft and the drive pulley 154. The clamp assembly 170 includes flanges 174*a*, 174*b* that apply a clamping force to the cutting wheel 25 (FIG. 8).

Figure 7B:
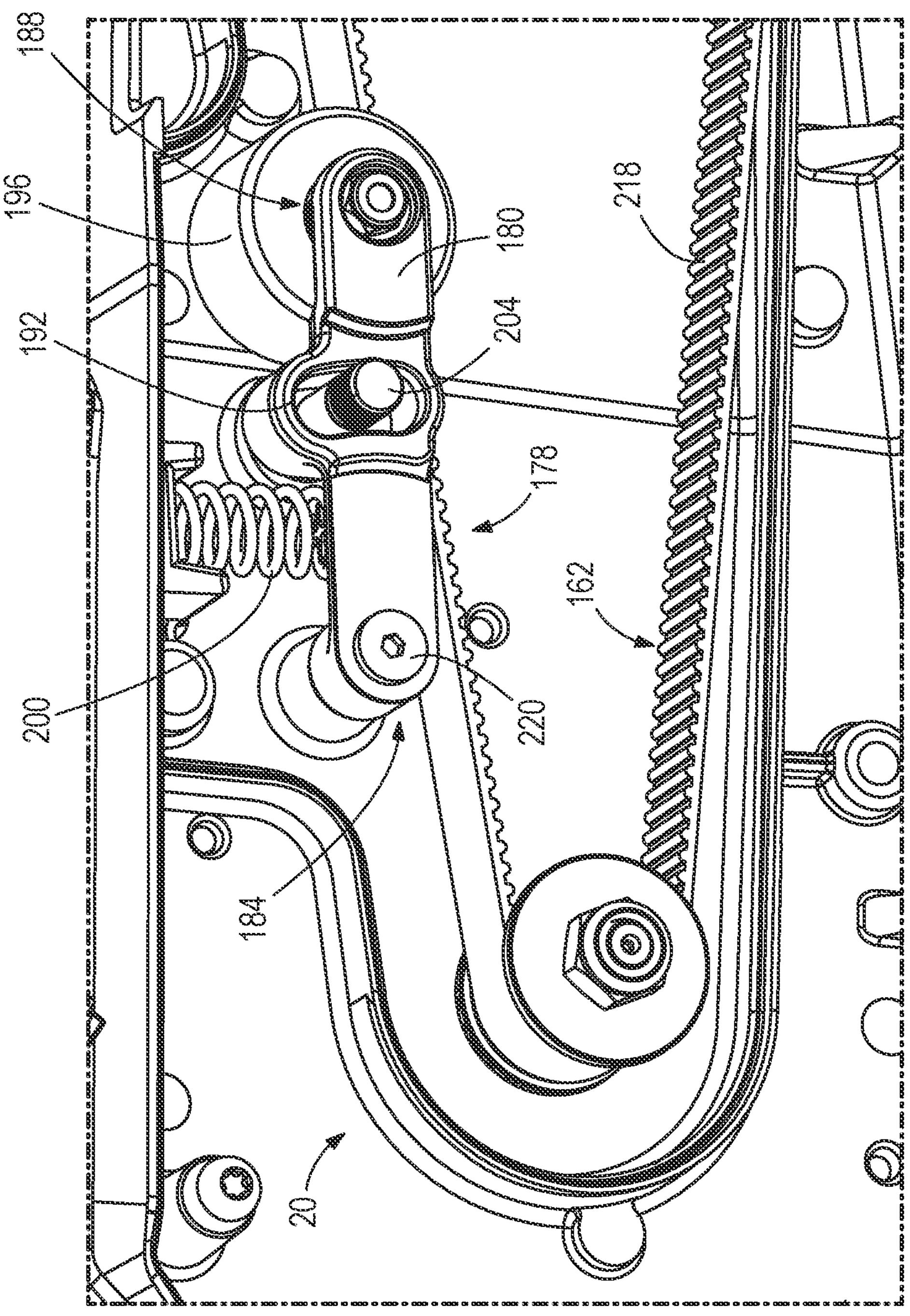
FIG. 7B is an enlarged view of the cut-off saw of FIG. 7A, illustrating a belt tensioner assembly.

The saw 10 further includes a belt tensioner assembly 178 (FIGS. 7A and 7B) configured to apply tension to the belt 162 to maintain an appropriate amount of belt wrap on each of the pulleys 154, 158 and tension in the belt 162. As shown in FIG. 7B, the belt tensioner assembly 178 includes a tensioner arm 180 having a first end 184, a second end 188 opposite the first end 184, and a recess 192 positioned between the first end 184 and the second end 188, a tensioner pulley 196, and a spring 200. A fastener 204, fixed to the support arm 20, is received through the recess 192 of the tensioner arm 180. The tensioner arm 180 is pivotably coupled to the support arm 20 by a pin 220 positioned along the first end 184 of the tensioner arm 180. The tensioner pulley 196 is coupled to the second end 188 of the tensioner arm 180. To tension the belt 162, the spring 200 is configured to impart a clockwise moment to the tensioner arm 180 causing the tensioner arm 180 to pivot. As the tensioner arm 180 pivots, the tensioner pulley 196 engages the belt 162 to tension the belt 162. The pivotal movement of the tensioner arm 180 is limited by the fastener 204 received within the recess 192 of the tensioner arm 180.

The drive pulley 154 defines a first rotational axis 182 and the driven pulley 158 defines a second rotational axis 186 spaced from the first rotational axis 182. The support arm 20 includes a first arm portion 190 (FIG. 1) coupled to the housing 15 and a second arm portion 194, or cover (FIG. 1), coupled to the first arm portion 190 and configured to enclose the drive assembly 150 during ordinary operation. The second arm portion 194 is coupled to the first arm portion 190 by screws but can be attached via snap fit or any other suitable manner in other embodiment. An interior of the first arm portion 190 defines a wall 198 that surrounds the drive pulley 154 and the driven pulley 158 of the drive assembly 150. The wall 198 of the first arm portion 190 is configured to prevent debris and dust from contacting the drive assembly 150. In the illustrated embodiment, the motor housing 60 is fastened to the first arm portion 190 by a plurality of bolts 152 (FIGS. 6 and 7A). The output shaft of the motor 62 extends through the first arm portion 190 to the drive pulley 154. The spindle 166 also extends through the first arm portion 190 and is supported by two bearings 206, 208 (FIG. 8).

The battery receptacle 80 is defined by a first wall 210 parallel with a top surface 212 (FIG. 1) of the housing 15 and a second wall 214 oriented at an oblique angle A1 (FIG. 5) relative to the first wall 210. In relation to a longitudinal axis 216 of the support arm 20, the first wall 210 and the second wall 214 of the battery receptacle 80 are oriented at oblique angles A2, A3 (FIG. 7A). The longitudinal axis 216 of the support arm 20 extends in a direction that is transverse to the first rotational axis 182 of the drive pulley 154 and the second rotational axis 186 of the driven pulley 158. In some embodiments of the saw 10, the first wall 210 is oriented at an angle A2 of about 140 degrees relative to the longitudinal axis 216 of the support arm 20 and the second wall 214 is oriented at an angle A3 of about 80 degrees relative to the longitudinal axis 216 of the support arm 20. The first wall 210 of the battery receptacle 80 is also oriented at an angle A4 (FIG. 7A) of about 34 degrees relative to a handle axis 217 defined by the rear handle 45 of the saw 10.

The illustrated belt 162 is a synchronous belt having a plurality of teeth 218 (FIG. 7B) extending laterally across a width of the belt 162. The teeth 218 are engageable with corresponding teeth on the driven pulley 158 and the drive pulley 154. The toothed engagement between the synchronous belt 162 and the pulleys 154, 158 prevents the belt 162 from slipping under high loads as may otherwise occur with a V-belt. In addition, the relatively flat profile of the synchronous belt 162 allows the drive pulley 154 to be smaller in diameter when compared with a V-belt configuration. As such, a higher speed reduction can be achieved between the drive pulley 154 and the driven pulley 158. For example, in some embodiments, the drive pulley 154 and the driven pulley 158 may be sized to provide a 4:1 reduction from the motor output shaft to the spindle 166. In other embodiments, the drive pulley 154 and the driven pulley 158 may be sized to provide between a 3:1 and a 5:1 reduction from the motor output shaft to the spindle 166.

Figure 11:
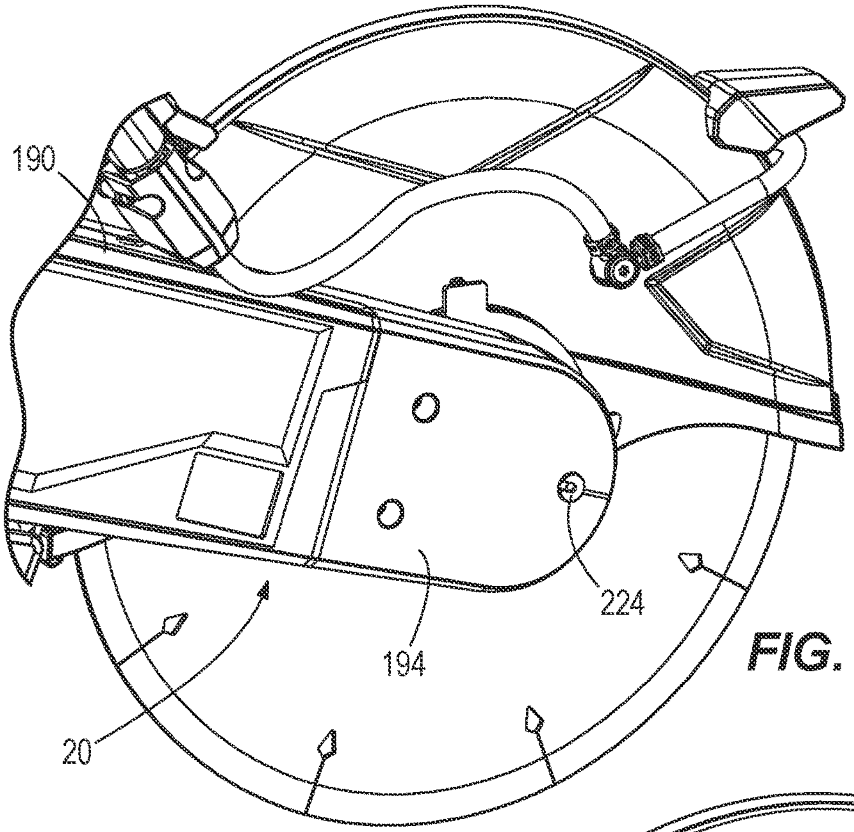
FIG. 11 is an enlarged view of the support arm of the cut-off saw of FIG. 1.
Figure 12:
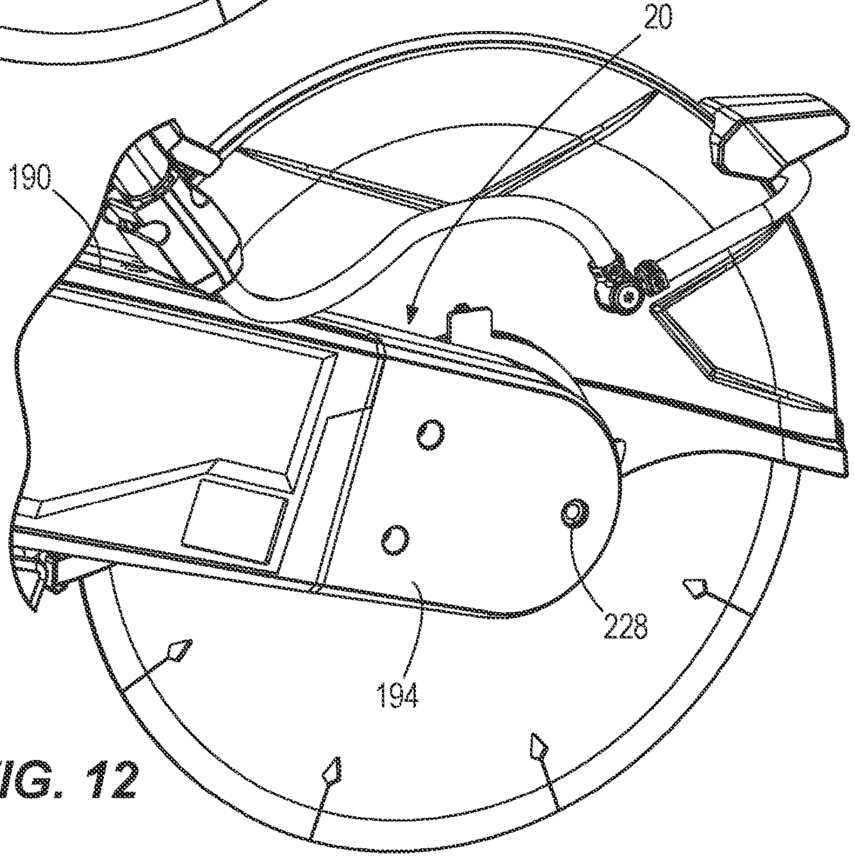
FIG. 12 is an enlarged view of the support arm of the cut-off saw of FIG. 1, with portions removed.

With reference to FIGS. 11 and 12, the support arm 20 may include a rubber plug 224 removably coupled to the second arm portion 194 of the support arm 20. The rubber plug 224 is configured to be inserted into an access hole 228 that extends through the second arm portion 194. The rubber plug 224, when placed in the access hole 228, prevents debris from entering an interior of the support arm 20 and obstructing the drive assembly 150.

FIGS. 14-17 illustrates the saw 10 with an origin O positioned at the center of the cutting wheel 25, the origin O defining a coordinate system including an X-axis that extends along a longitudinal axis of the saw 10, a Y-axis that extends perpendicular to the longitudinal axis of the saw 10, and a Z-axis (not shown) that extends transverse to the longitudinal axis of the saw 10. In different embodiments of the saw 10, a center of gravity CG of the saw 10 is positioned in the negative direction (i.e., rearward or to the left) of the origin 0.

Figure 14:
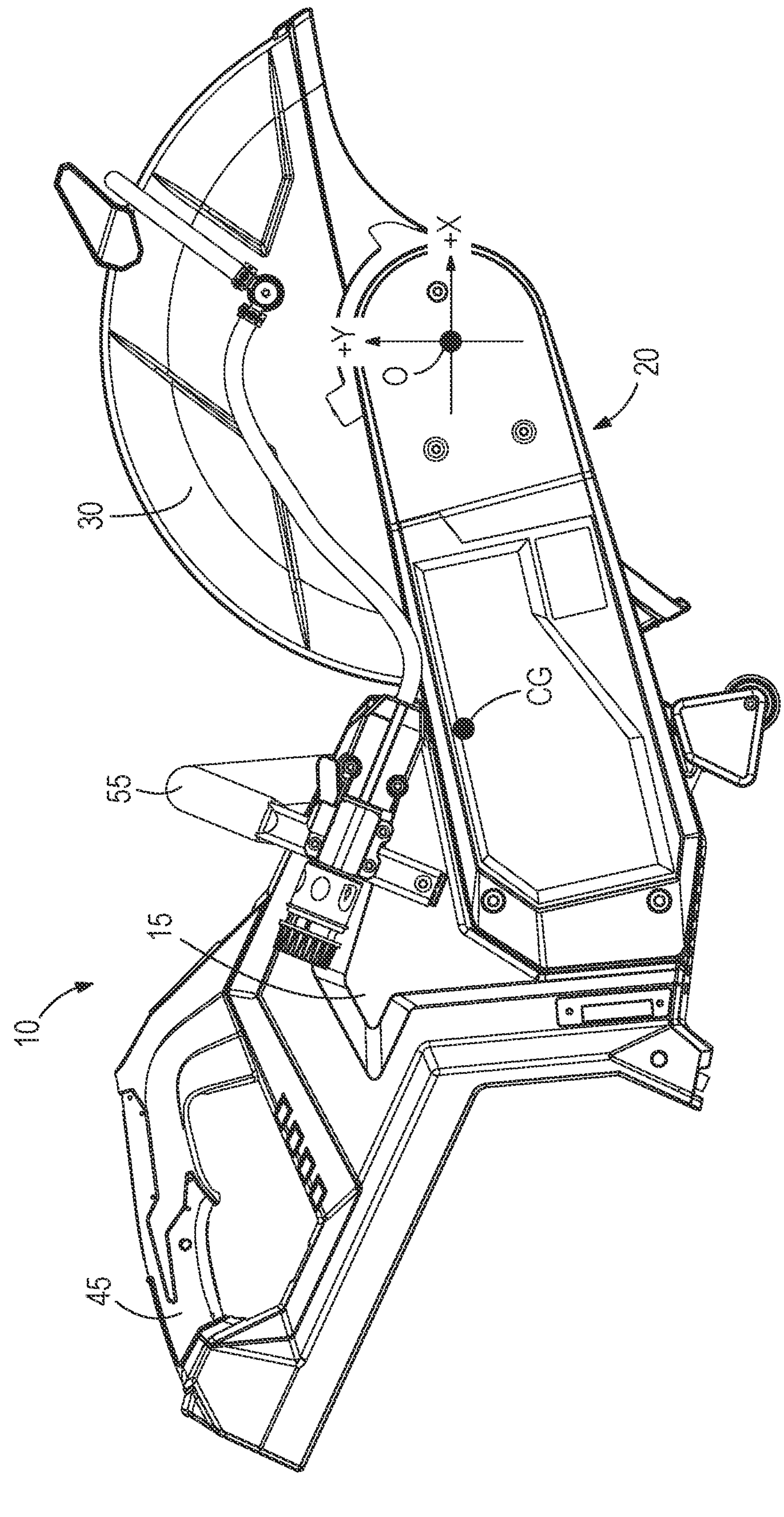
FIG. 14 is a side view of the cut-off saw of FIG. 1 with the saw blade removed.
Figure 15:
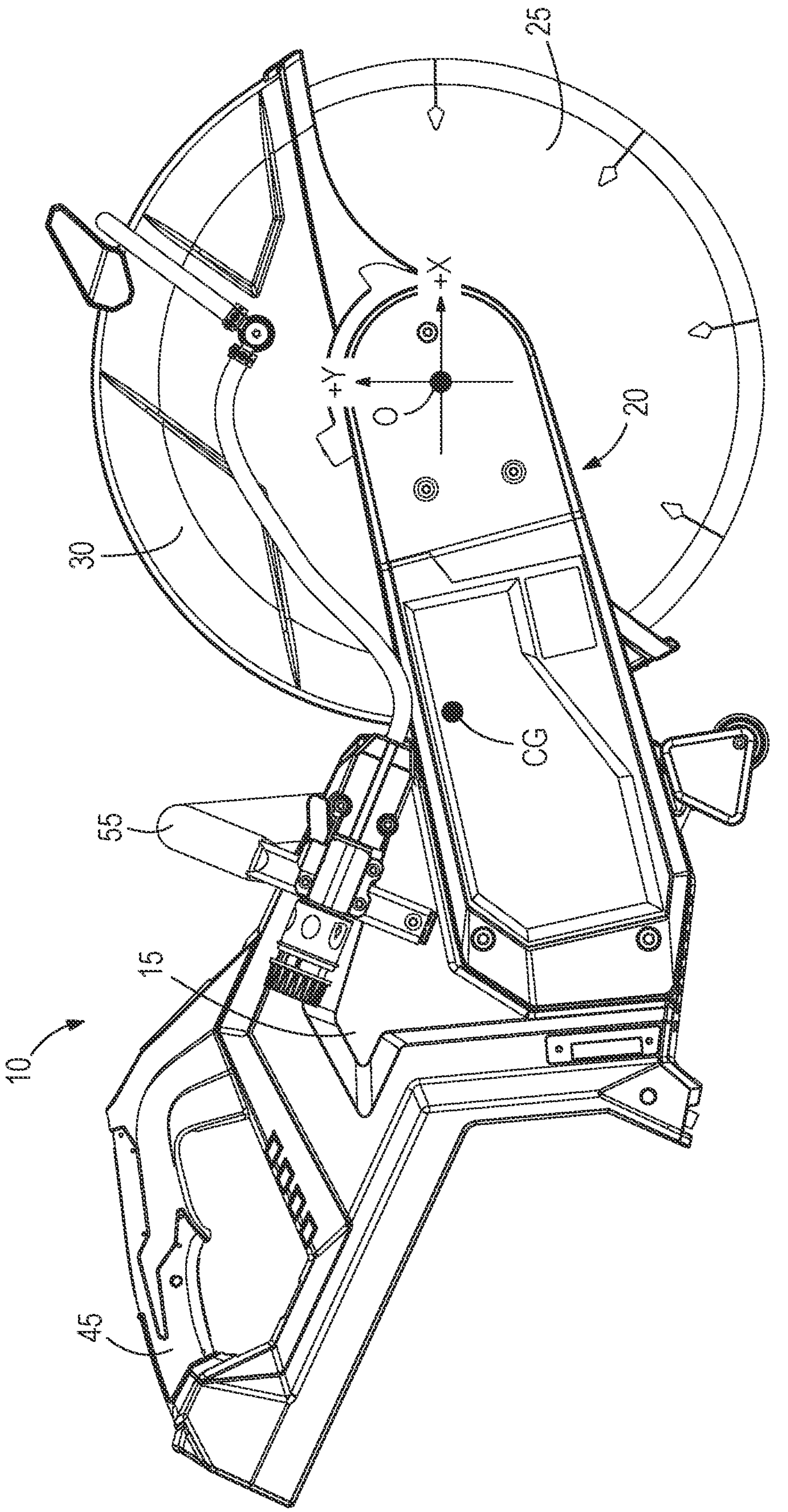
FIG. 15 is a side view of the cut-off saw of FIG. 1.
Figure 16:
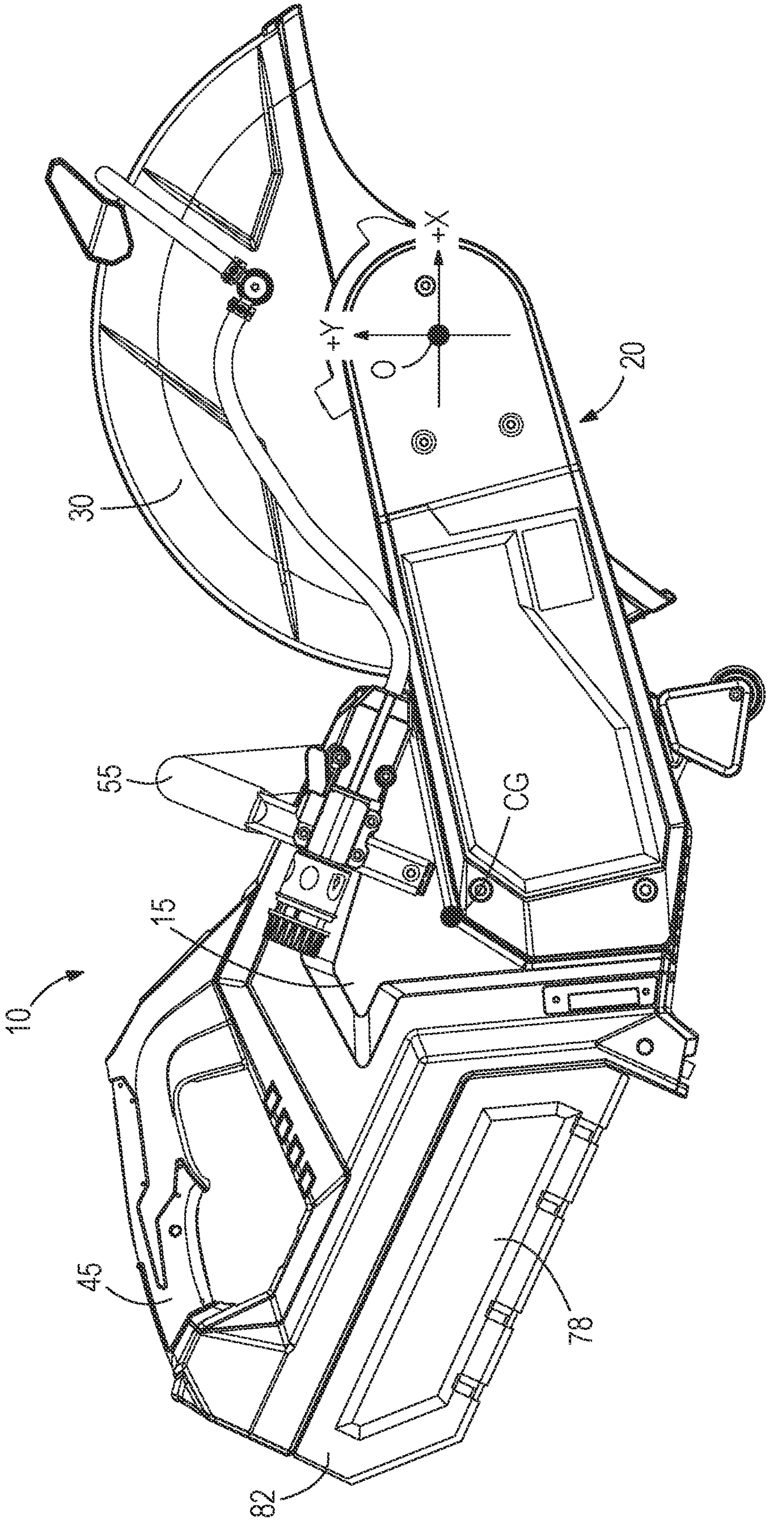
FIG. 16 is a side view of the cut-off saw of FIG. 14 with an attached battery pack.
Figure 17:
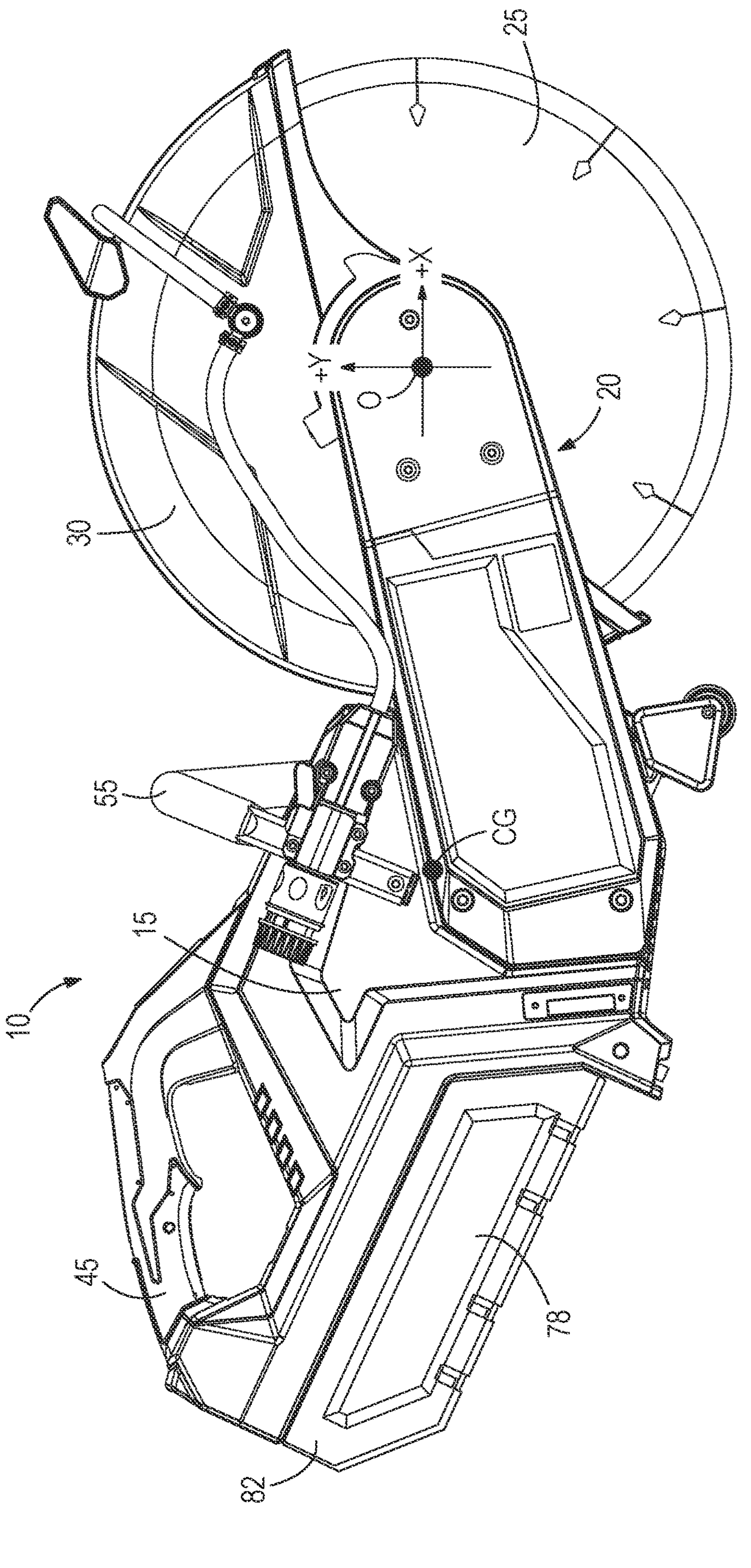
FIG. 17 is a side view of the cut-off saw of FIG. 1 with an attached battery pack.

With reference to FIG. 14, the saw 10 weighs 19.76 lbs. without the battery pack 78 and the cutting wheel 25 attached. As a result, the center of gravity CG of the saw 10 is positioned −212 mm to −214 mm along the X-axis, −4 mm to −6 mm along the Y-axis, and −3 mm to −5 mm along the Z-axis from the origin O. With reference to FIG. 15, with the cutting wheel attached, the saw 10 weighs within a range of 22.50 lbs. to 23.10 lbs. The center of gravity CG of the saw 10 is then positioned −181 mm to −183 mm along the X-axis, −3.25 mm to −5.25 mm along the Y-axis, and −2.25 mm to −4.25 mm along the Z-axis from the origin O. With reference to FIG. 16, with the battery pack 78 attached but the cutting wheel 25 removed, the saw 10 weighs within a range of 29.10 lbs. to 29.7 lbs. and the center of gravity CG is positioned −321 mm to −323 mm along the X-axis, −5.5 mm to −7.5 mm along the Y-axis, and −8 mm to −10 mm along the Z-axis from the origin O. With reference to FIG. 17, with both the cutting wheel and the battery pack 78 attached, the saw 10 weighs within a range of 32.40 lbs. to 33 lbs. and the center of gravity CG of the saw 10 is positioned −288 mm to −290 mm along the X-axis, −4.75 mm to −6.75 mm along the Y-axis, and −7 mm to −9 mm along the Z-axis from the origin 0.

With reference to FIGS. 5 and 6A, the saw 10 further includes an airflow path 232 that extends through the housing 15 of the saw 10. The airflow path 232 extends from an inlet vent 236 to an exhaust vent 240 (FIG. 4), in which the inlet vent 236 and the exhaust vent 240 are illustrated as slotted openings specifically positioned to shield an interior of the housing 15 from fluid, dust, and debris present during operation of the saw 10. The inlet vent 236 is positioned along the rear portion of the housing 15 and underneath the rear handle 45 (FIG. 1), while the exhaust vent 240 is positioned on a bottom portion (FIG. 4) of the saw 10 and in front of the splash guard 84.

Air is drawn through the inlet vent 236 into the housing 15 and is immediately split into a first airflow path **232*a* and a second airflow path 232*b* to cool, respectively, the heat sinks 74 associated with the standalone resistors 67 and the heat sink 71 of the potting boat assembly 70. When traveling along the first airflow path 232*a*, air is forced to flow through a space defined between the resistor heat sinks 74. As for the second airflow path 232*b*, air is forced to flow through parallel channels 91 (FIG. 6E) defined by adjacent fins 79 on the bottom surface of the heat sink 71. After passing the resistor heat sinks 74 and the heat sink 71 of the potting boat assembly 70, the first airflow path 232*a* and the second airflow path 232*b* merge back into the single airflow path 232 to flow through the motor 62 before being discharged through the exhaust vent 240. To induce the airflow along the airflow path 232 during operation of the saw a fan (not shown) is provided with the motor 62**.

Figure 2:
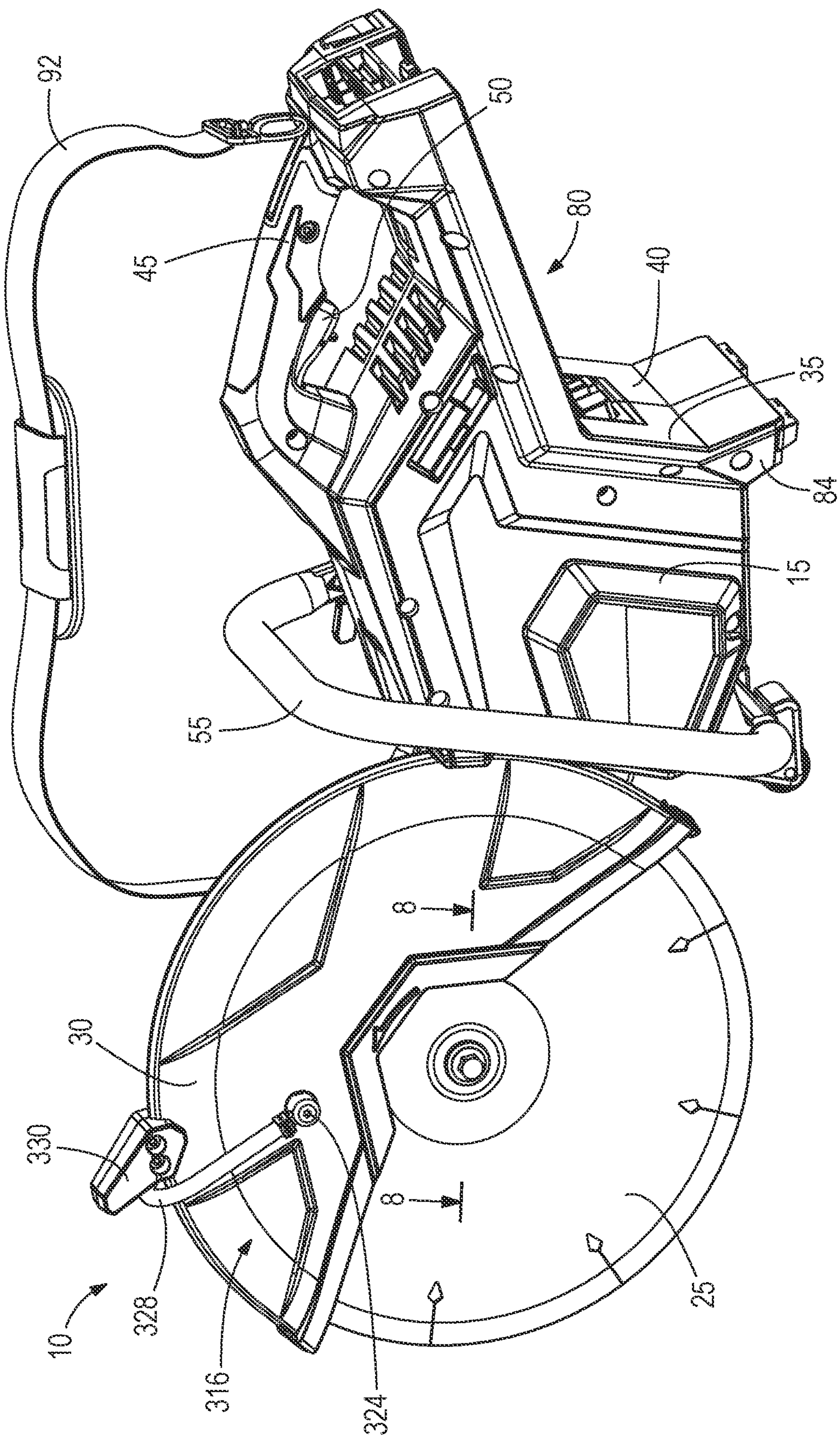
FIG. 2 is an opposite side perspective view of the cut-off saw of FIG. 1.
Figure 3:
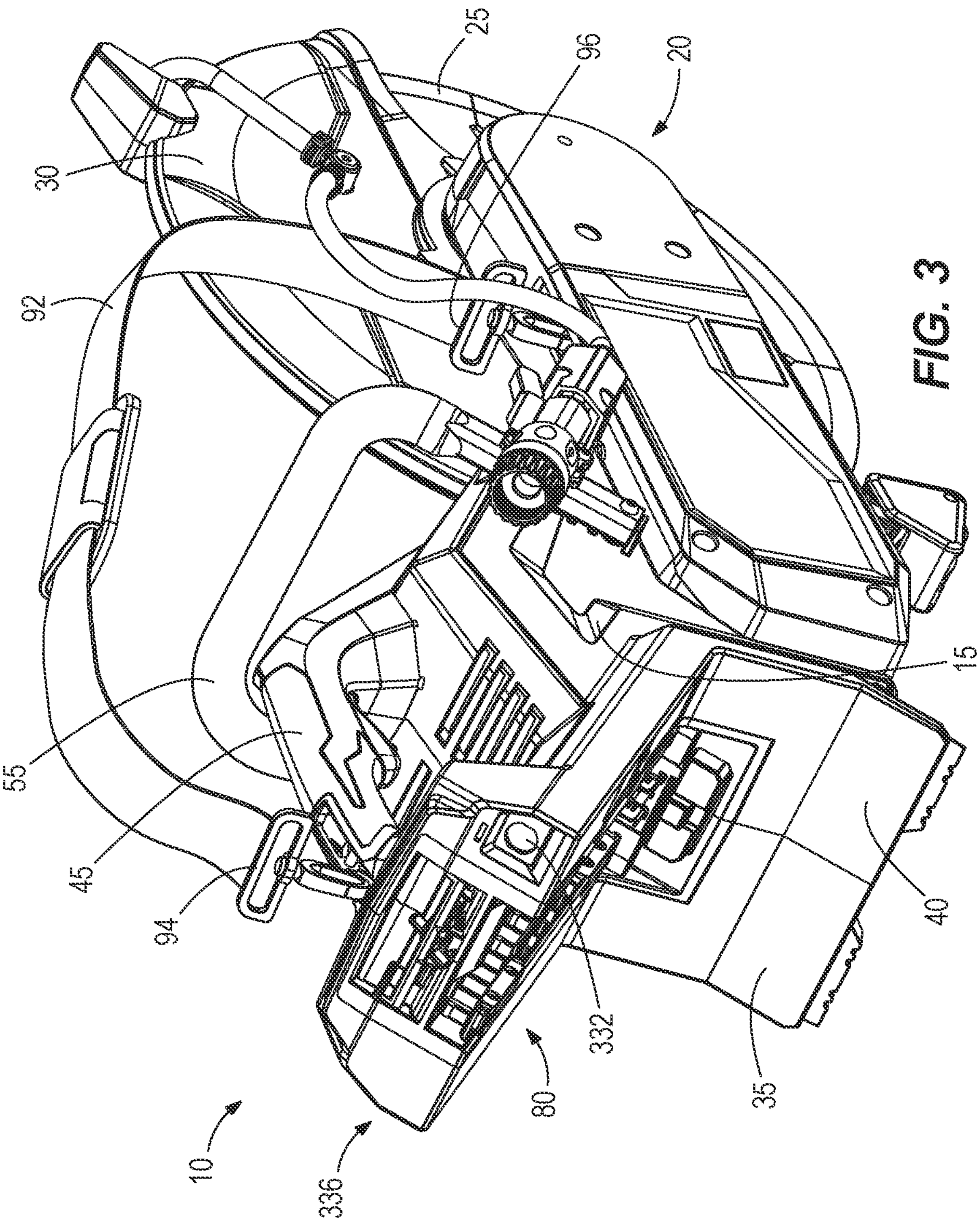
FIG. 3 is a rear perspective view of the cut-off saw of FIG. 1.
Figure 13:
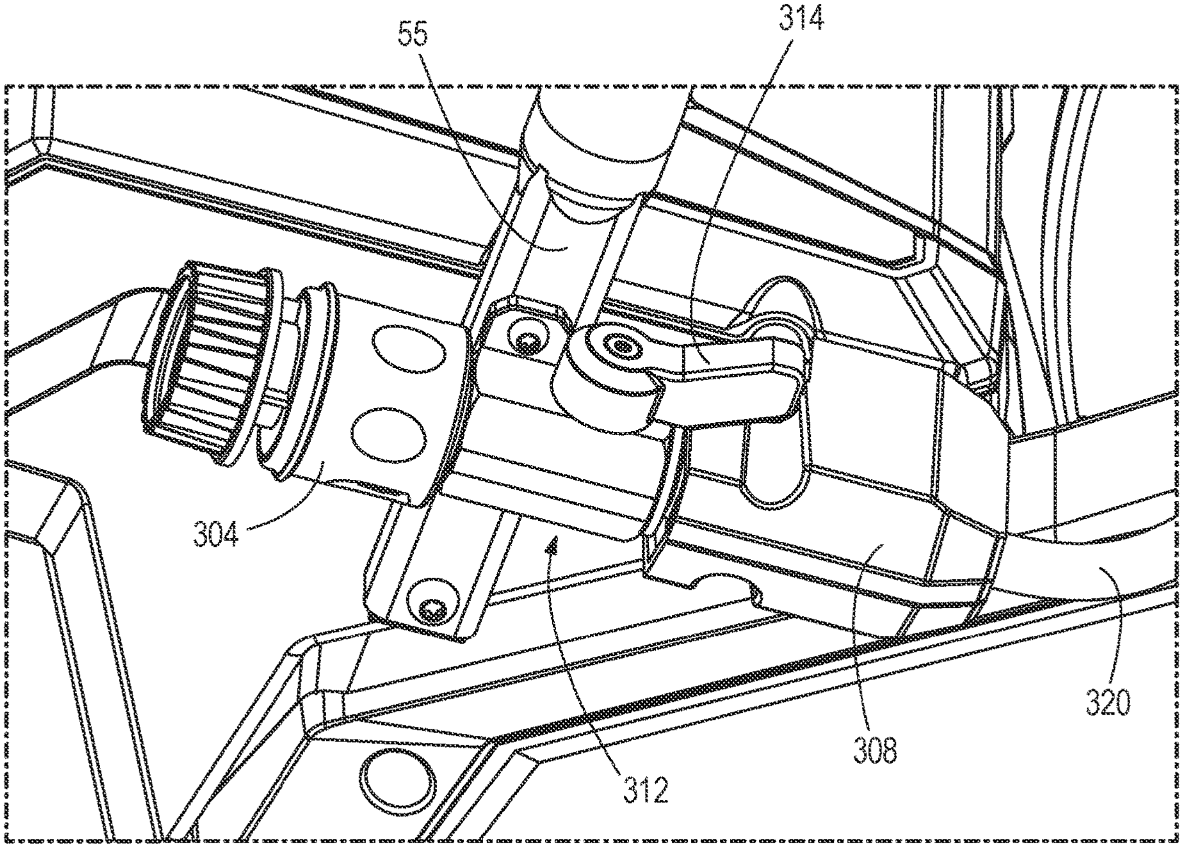
FIG. 13 is an enlarged view of the cut-off saw of FIG. 1, illustrating a portion of a fluid distribution system.

With reference to FIGS. 1, 2, and 13, the saw 10 further includes a fluid distribution system 300. The fluid distribution system 300 includes a first connector portion 304, a second connector portion 308 coupled to the upper portion of the housing 15, a control valve 312 coupled to the forward handle 55 and disposed between the first connector portion 304 and the second connector portion 308, and a distributor 316 coupled to the guard 30. A first supply line (not shown) can be attached to the first connector portion 304 to provide fluid such as water to the fluid distribution system 300 from an external source (not shown). A second supply line 320 extends from the second connector portion 308 to the distributor 316. In the illustrated embodiment, the distributor 316 includes a pair of spray nozzles 324 disposed on opposite sides of the guard 30 connected by a third supply line 328. The spray nozzles 324 are operable to discharge fluid onto each side of the cutting wheel 25 for cooling, lubrication, and dust abatement. In the illustrated embodiment, an auxiliary handle 330 is attached to the guard 30 adjacent the third supply line 328. However, the third supply line 328 may alternatively extend through the handle 330.

The control valve 312 of the fluid distribution system 300 is a manual water valve having a valve handle 314 movable between a first position and a second position. The first position coincides with an off state of the valve 312 in which fluid flow from the connector portion 304 to the connector portion 308 is prohibited, and the second position coincides with an on state of the valve 312 (shown in FIG. 13) in which fluid flow from the connector portion 304 to the connector portion 308 is permitted. As the saw 10 is laid down on a surface, the valve handle 314 may contact the surface to be moved from the first position to the second position to adjust the valve 312 to the on state, as shown in FIG. 13. In other embodiments of the saw 10, the action of laying the saw 10 on a surface may cause the valve handle 314 to contact the surface and adjust the valve handle 314 from the second position to the first position to adjust the valve 312 from the on state to the off state.

In operation of the saw 10, the user depresses the power button 48 to turn on the saw 10 for operation. Once prepared for operation, the user depresses the trigger 50 positioned on the rear handle 45 to activate the motor 62. The motor 62 outputs a torque through the output shaft to the attached drive pulley 154. The drive pulley 154 is driven to rotate, causing the belt 162 to rotate and in turn, rotate the driven pulley 158 and the spindle 166. As the spindle 166 rotates, the cutting wheel 25 rotates to perform cutting operations. During operation, the user can perform cutting operations while grasping the forward handle 55 and the rear handle 45. The user can also transport the saw 10 across a surface during operation via the pair of the wheels 86*a*, 86*b*.

In other embodiments of the saw 10, the fluid distribution system 300 is electrically connected to the electronic control unit 65. When the trigger 50 is depressed to activate the motor 62, the electronic control unit 65 receives a first electronic signal to allow fluid to flow through the fluid distribution system 300. When the trigger 50 is released, the electronic control unit 65 receives a second electronic signal to stop fluid from flowing through the fluid distribution system 300. In such an embodiment of the saw 10 in which the fluid distribution system 300 is electronically controlled by the control unit 65, the control valve 312 may be, for example, a solenoid-actuated valve operable between an on state and a closed state in response to being actuated by the control unit 65. To control a flow rate of the fluid within the fluid distribution system 300, the control valve 312 may be adjusted by the user to increase or decrease the flow rate of the fluid. As such, the flow rate of fluid discharged from the spray nozzles 324 remains constant regardless to the extent to which the trigger 50 is depressed.

In another embodiment of the saw 10, the saw 10 is configured to be supported by a cart (not shown) capable of transporting the saw 10 over surfaces during and between cutting operations. The cart can transport the saw 10 in either a forward or backwards direction. The cart includes a frame to which the saw 10 is attachable, a handle upwardly extending from the frame that is graspable by a user for maneuvering the cart, a front wheel, and a rear wheel assembly having two rear wheels. The frame includes a material discharge guard (e.g., mud flap) that blocks material cut by the saw 10 from contacting a user of the cart and a loop that is used as a lifting point or hoist loop. A mounting assembly of the cart is used to secure the saw to the frame. The mounting assembly includes a front mount on a lower portion of the frame and a rear mount on an upper portion of the frame.

The cart further includes a remote actuation system for activating and deactivating the saw 10 when it is supported on the frame. The remote actuation system interfaces with an electrical connector 332 (FIG. 3) on the saw 10 to provide an input control signal to a saw control unit or the electronic control unit 65 onboard the saw 10 which, in turn, can activate and deactivate the saw 10. The remote actuation system includes a cart mating electrical connector configured to mechanically and electrically connect to the electrical connector 332 on the saw 10. The remote actuation system also includes a wire extending from the cart mating electrical connector, a cart control unit to which an opposite end of the wire is connected to transmit an input control signal from the cart control unit to the saw control unit 65, via the cart mating electrical connector and the electrical connector 332, to selectively activate and vary a rotational speed of the motor 62 and the cutting wheel 25.

In the illustrated embodiment, the electrical connector 332 is provided on a rear end 336 of the saw 10 (FIG. 3), and the cart control unit is provided on an upper portion of the handle of the cart. In some embodiments, the cart electrical connector may be located on a cover or a housing of the rear mount. In some embodiments, the wire is routed on an exterior of the cart. In other embodiments, the wire is routed either completely inside or partially inside the cart. A rubber plug (not shown) may be provided and inserted into the connector 332 when it is not in use.

The remote actuation system further includes a throttle lever pivotably coupled to the handle of the cart and in communication with the cart control unit to provide an input to the cart control unit. In some embodiments, the remote actuation system may further include a lockout system including a lockout actuator (e.g., a button, not shown) coupled to the handle and in communication with the cart control unit. The lockout actuator is moveable between a first position and a second position. The cart control unit is operable in an idle mode when the lockout actuator is in the first position and an active mode when the lockout actuator is in the second position. While in the active mode, pivoting of the throttle lever prompts the cart control unit to output an input control signal to the saw 10 to activate the motor 62, causing the cutting wheel of the saw 10 to rotate. In some embodiments, the rotational speed of the motor 62 varies with dependence on the degree to which the throttle lever is pivoted, such that the motor 62 will operate at its maximum rotational speed when the throttle lever is maximally pivoted. While in the idle mode, pivoting of the throttle lever does not prompt the cart control unit to output an input control signal to the saw 10, and thus pivoting movement of the throttle lever will not activate the motor 62.

Figure 18:
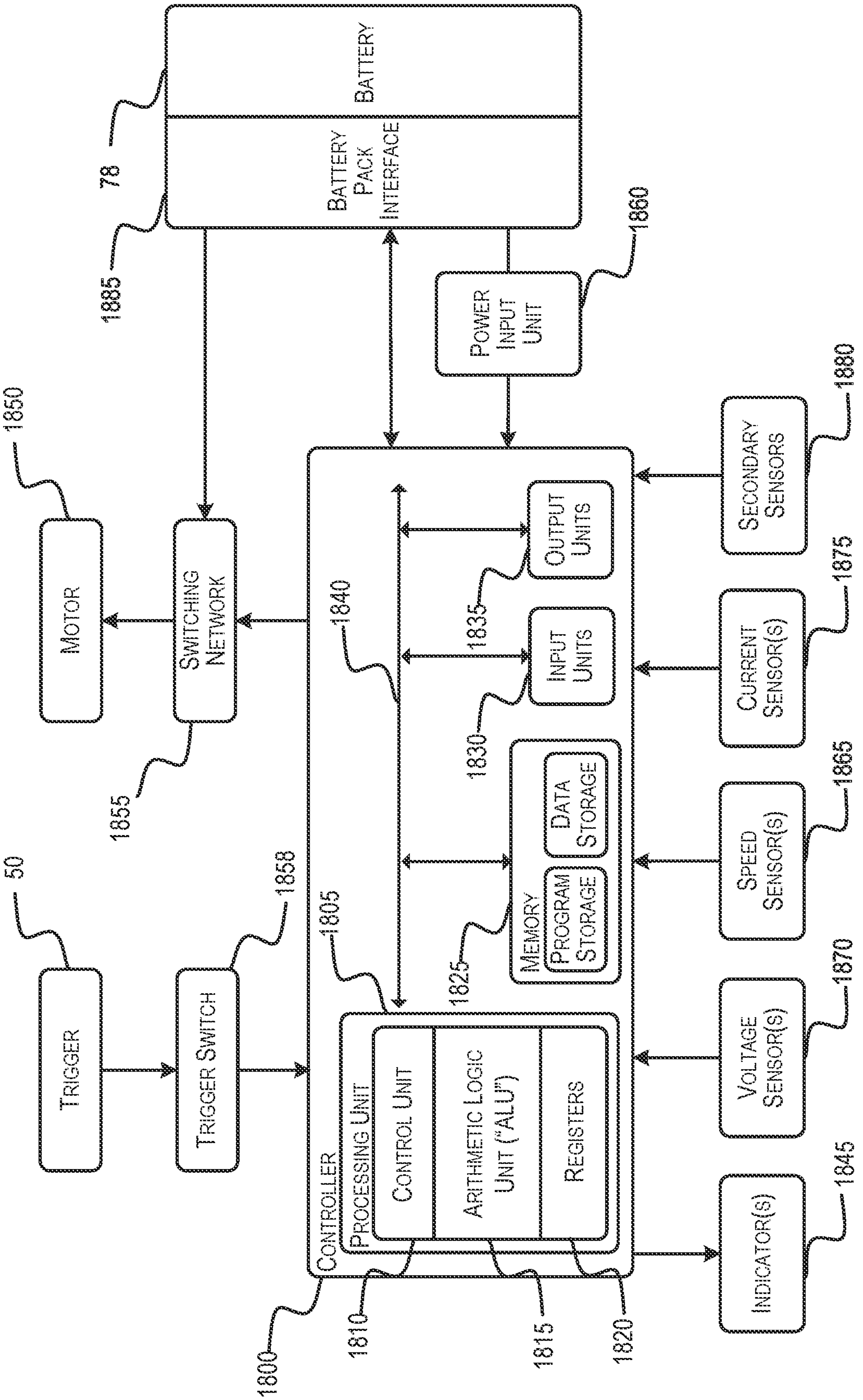
FIG. 18 is a block diagram of a controller for the cut-off saw of FIG. 1, according to embodiments described herein.

A controller 1800 for the saw 10 is illustrated in FIG. 18. The controller 1800 is electrically and/or communicatively connected to a variety of modules or components of the saw 10. For example, the illustrated controller 1800 is connected to indicators 1845, a voltage sensor 1870, a speed sensor 1865, a current sensor 1875, secondary sensors 1880, the trigger 50 (via a trigger switch 1858), a power switching network 1855, and a power input unit 1860.

Figure 19:
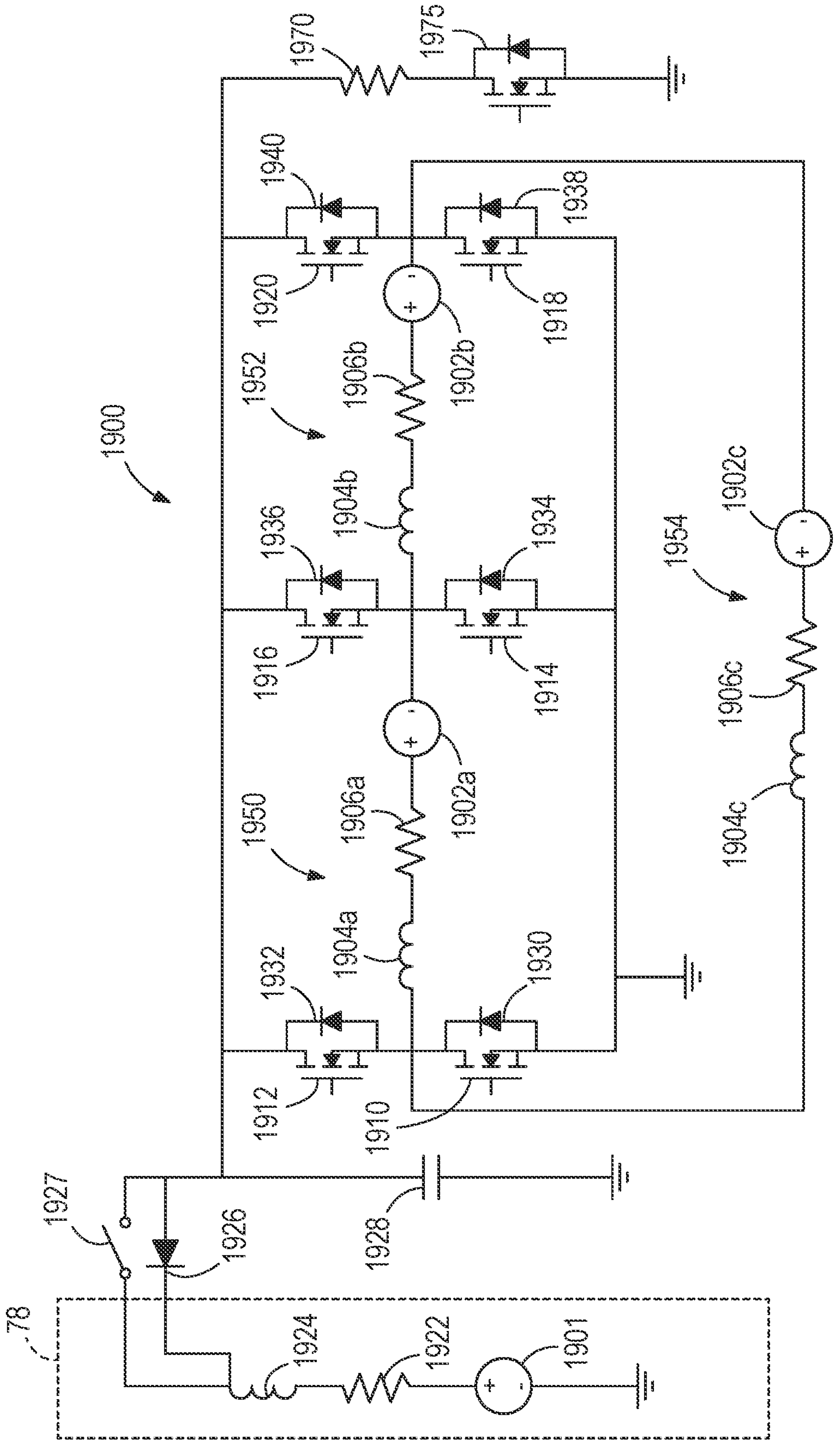
FIG. 19 is a circuit diagram of a switching network, according to embodiments described herein.

The controller 1800 includes a plurality of electrical and electronic components that provide power, operational control, and protection to the components and modules within the controller 1800 and/or the saw 10. For example, the controller 1800 includes, among other things, a processing unit 1805 (e.g., a microprocessor, an electronic processor, an electronic controller, a microcontroller, or another suitable programmable device), a memory 1825, input units 1830, and output units 1835. The processing unit 1805 includes, among other things, a control unit 1810, an arithmetic logic unit ("ALU") 1815, and a plurality of registers 1820 (shown as a group of registers in FIG. 18), and is implemented using a known computer architecture (e.g., a modified Harvard architecture, a von Neumann architecture, etc.). The processing unit 1805, the memory 1825, the input units 1830, and the output units 1835, as well as the various modules connected to the controller 1800 are connected by one or more control and/or data buses (e.g., common bus 1840). The control and/or data buses are shown generally in FIG. 18 for illustrative purposes. The use of one or more control and/or data buses for the interconnection between and communication among the various modules and components would be known to a person skilled in the art in view of the embodiments described herein The memory 1825 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 1805 is connected to the memory 1825 and executes software instructions that are capable of being stored in a RAM of the memory 1825 (e.g., during execution), a ROM of the memory 1825 (e.g., on a generally permanent basis), or another non-transitory computer readable medium such as another memory or a disc. Software included in the implementation of the saw 10 can be stored in the memory 1825 of the controller 1800. The software includes, for example, firmware, one or more applications, program data, filters, rules, one or more program modules, and other executable instructions. The controller 1800 is configured to retrieve from the memory 1825 and execute, among other things, instructions related to the control processes and methods described herein. In other embodiments, the controller 1800 includes additional, fewer, or different components The controller 1800 drives the motor 1850 in response to a user's actuation of the trigger 50. Depression of the trigger 50 actuates a trigger switch 1858, which outputs a signal to the controller 1800 to drive the motor 1850. In some embodiments, the controller 1800 controls the power switching network 1855 (e.g., a FET switching bridge) to drive the motor 1850. For example, the power switching network 1855 may include a plurality of high side switching elements (e.g., FETs) and a plurality of low side switching elements (e.g., FETs). The controller 1800 may control each FET of the plurality of high side switching elements and the plurality of low side switching elements to drive each phase of the motor 1850. For example, the power switching network 1855 may be controlled to more quickly deaccelerate the motor 1850. FIG. 19 provides an example power switching network 1900, as described below in more detail.

The indicators 1845 are also connected to the controller 1800 and receive control signals from the controller 1800 to turn on and off or otherwise convey information based on different states of the saw 10. The indicators 1845 include, for example, one or more light-emitting diodes (LEDs), or a display screen. The indicators 1845 can be configured to display conditions of, or information associated with, the saw 10. For example, the indicators 1845 can display information relating to an operational state of the saw 10, such as a mode or speed setting. The indicators 1845 may also display information relating to a fault condition, or other abnormality of the saw 10 (such as, for example, an excessive motor speed). In some embodiments, the indicators 1845 display information relating to an amount of power drawn by the motor 1850. In some embodiments, the indicators 1845 indicate whether the controller 1800 is performing a protective operation, such as reducing the duty cycle of the PWM signal used to drive the motor 1850 or shutting down of the saw 10. In addition to or in place of visual indicators, the indicators 1845 may also include a speaker or a tactile feedback mechanism to convey information to a user through audible or tactile outputs.

The battery pack interface 1885 is connected to the controller 1800 and is configured to couple with the battery pack 78. The battery receptacle 80 includes a combination of mechanical (e.g., a battery pack receiving portion, the battery receptacle 80, etc.) and electrical components configured to and operable for interfacing (e.g., mechanically, electrically, and communicatively connecting) the saw 10 with the battery pack 78. The battery pack interface 1885 is coupled to the power input unit 1860. The battery pack interface 1885 transmits the power received from the battery pack 78 to the power input unit 1860. The power input unit 1860 includes active and/or passive components (e.g., voltage step-down controllers, voltage converters, rectifiers, filters, etc.) to regulate or control the power received through the battery pack interface 1885 and to the controller 1800. In some embodiments, the battery pack interface 1885 is also coupled to the power switching network 1855. The operation of the power switching network 1855, as controlled by the controller 1800, determines how power is supplied to the motor 1850.

The voltage sensor 1870 senses a voltage provided by the battery pack 78, a voltage of a phase of the motor 1850, a collective voltage of the phases of the motor 1850, or a combination thereof. The current sensor 1875 senses a current provided by the battery pack 78, at least one of the phase currents of the motor 1850, or a combination thereof. The current sensor 1875 may be, for example, an inline phase current sensor, a pulse-width-modulation-center-sampled inverter bus current sensor, or the like. The speed sensor 1865 senses a speed of the motor 1850. The speed sensor 1865 may include, for example, one or more Hall effect sensors. The secondary sensor(s) 1880 includes various other sensors for monitoring characteristics associated with the saw 10 (e.g., an accelerometer, a workpiece contact sensor, a temperature sensor, a position sensor, etc.).

FIG. 19 illustrates a power switching network 1900. In the illustrated embodiment, the motor 1850 is a brushless DC motor including three phases. For example, the motor 1850 may include an outer stator having six stator windings arranged in three phases, and an inner rotor with four permanent magnets. In other embodiments, however, different types of motors may be used, such as those with a different number of phases, windings, and magnets. As shown in FIG. 19, the power switching network 1900 includes three high side electronic switches 1912, 1916, 1920 and three low side electronic switches 1910, 1914, 1918. In the illustrated embodiment, the electronic switches 1910-1920 include MOSFETs. In other embodiments, other types of electronic switches may be used, such as bipolar junction transistors ("BJT"), insulated-gate bipolar transistors ("IGBT"), and other electronic switch types. Additionally, each electronic switch 1910-1920 is connected in parallel to a body diode 1930, 1932, 1934, 1936, 1938, and 1940, respectively.

In the diagram of FIG. 19, each phase of the motor 1850 is represented by an inductor, a resistor, and a voltage source. Since the motor 1850 is a three-phase motor, FIG. 19 illustrates three inductors 1904*a-c*, three resistors 1906*a-c*, and three voltage sources 1902*a-c*. Each inductor 1904*a-c* represents motor windings of each phase of the motor 1850. Each resistor 1906*a-c* represents motor windings of each phase of the motor 1850. Each voltage source 1902*a-c* represents the back electromagnetic force generated (e.g., back-electromotive force [emf]) in each phase. Back-emf is generated by the rotation of the rotor magnets inducing current in the stator windings. Additionally, the power switching network 1900 includes a brake switch 1975 connected in series with a brake resistor 1970. The brake switch 1975 and the brake resistor 1970 are connected in parallel to the first phase 1950, the second phase 1952, and the third phase 1954 of the motor 1850.

The power switching network 1900 receives power from the battery pack 78 (via the battery pack interface 1885). The battery pack 78 is represented by a power source 1901 connected in series with a resistor 1922 and an inductor 1924, which represent internal resistance and inductance of the battery pack interface 1885, the battery pack 78, or both. Additionally, the power source 1901 is connected in series with a parallel combination of a diode 1926 and a switch 1927. The diode 1926 and switch 1927 control the flow of current from the power source 1901. For example, the switch 1927 is switchable between a conducting state and a non-conducting state. The switch 1927 may be controlled based on actuation of the trigger 50. For example, in some embodiments, the controller 1800 controls the state of the switch 1927 based on the condition of the trigger 50. In some embodiments, the switch 1927 is closed by the controller 1800 when the trigger 50 is depressed, and the switch 1927 is opened when the trigger 50 is released. In some embodiments, the switch 1927 functions as the trigger switch 1858.

When the switch 1927 is in the conducting state, current can flow bidirectionally to and from the power source 1901. When the switch 1927 is in the non-conducting state, however, current (e.g., regenerative current) can only flow to the power source 1901 through the diode 1926. In some embodiments, the diode 1926 is not provided. A capacitor 1928 is connected in parallel to the power source 1901, as shown in FIG. 19. The capacitor 1928 smooths the voltage from (and to) the power source 1901.

Additionally, the controller 1800 controls the state of each of the electronic switches 1910-1920 in the power switching network 1900. To drive the motor 1850 forward, the controller 1800 sets the switch 1927 to be in the conducting state and activates a high side electronic switch 1912 and a low side electronic switch 1914. As shown in FIG. 19, the high side electronic switch 1912 is on a first side of the first phase 1950 of the motor 1850 and the low side electronic switch 1914 is on a second side of the first phase 1950. In such a configuration, the first phase 1950 of the motor 1850 is connected such that the back-emf has an opposite polarity with respect to the power source 1901. Accordingly, while the controller 1800 maintains the first high side electronic switch 1912 and the first low side electronic switch 1914 in a conducting state, the back-emf detracts from the overall power provided to the motor 1850. In other words, the motor current is set by dividing the difference between the voltage from the power source 1901 and the back-emf by the resistance of the motor 1850.

The controller 1800 determines which high side electronic switches 1912, 1916, 1920 and low side electronic switches 1910, 1914, 1918 to place in the conducting state based on the position of the rotor in relation to the stator of the motor 1850. In particular, each activation of a pair of high side electronic switch 1912, 1916, 1920 and a low side electronic switches 1910, 1914, 1918 rotates the motor 1850 approximately 120 degrees. When the motor 1850 rotates about 60 degrees, the controller 1800 deactivates one pair of electronic switches and activates a different pair of electronic switches to energize a different phase of the motor 1850. In particular, the controller 1800 activates the first high side electronic switch 1912 and the first low side electronic switch 1914 to drive the first phase 1950 of the motor 1850 forward. The controller 1800 activates the second high side electronic switch 1916 and the second low side electronic switch 1918 to drive the second phase 1952 of the motor 1850 forward, and the controller 1800 activates the third high side electronic switch 1920 and the third low side switch 1910 to drive the third phase 1954 of the motor 1850 forward. The switches 1910-1920 may be driven by the controller 1800 using a pulse width modulated ("PWM") control signal having a duty cycle. During each phase, the controller 1800 can set the current provided to the motor 1850 (and thus the speed and torque) by adjusting the duty ratio of the PWM control signal to one or both of the active switches.

Figure 20:
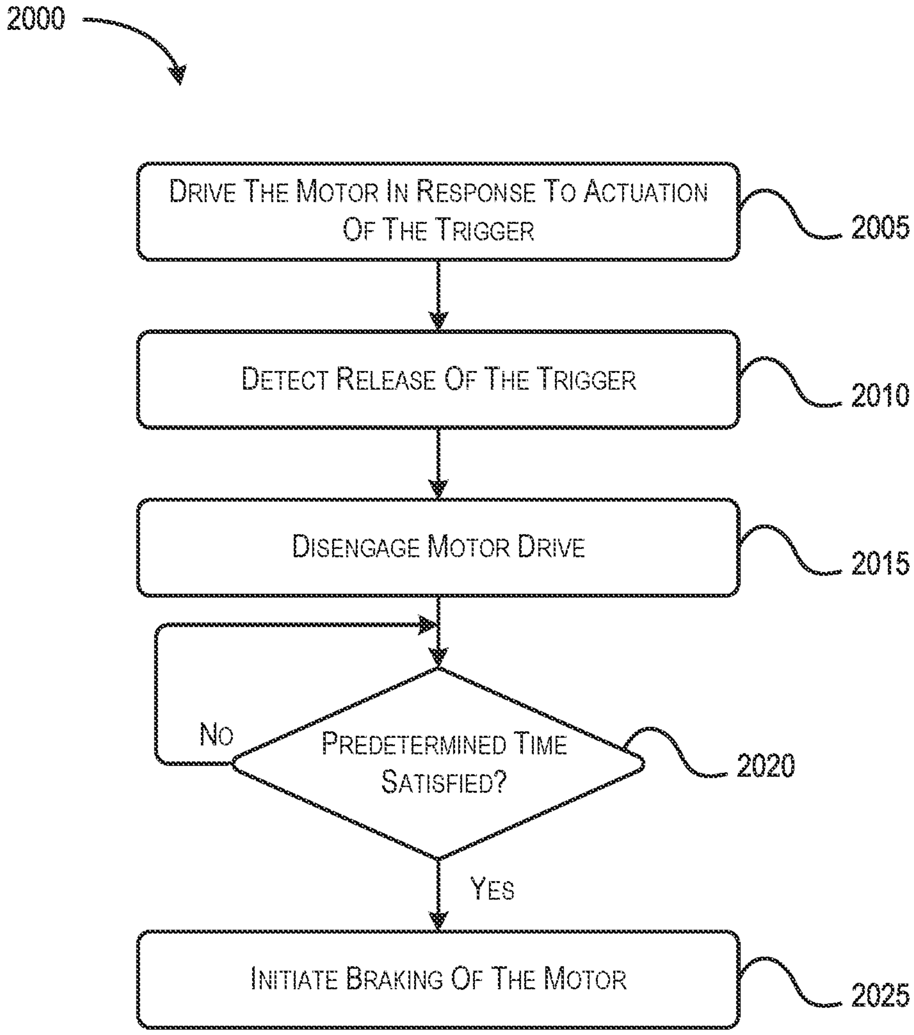
FIG. 20 is a block diagram of a method performed by the controller of FIG. 18, according to embodiments described herein.

To brake the motor 1850, the controller 1800 controls the brake switch 1975 to direct the motor current through the brake resistor 1970. FIG. 20 provides a flowchart illustrating a method 2000 of braking the motor 1850. The method 2000 is performed by the controller 1800. At block 2005, the controller 1800 drives the motor 1850 in response to actuation of the trigger 50. For example, the controller 1800 detects actuation of the trigger 50 based on a trigger signal from the trigger switch 1858. The controller 1800 controls the switch 1927 to a conducting state, and controls the high side electronic switches 1912, 1916, 1920 and the low side electronic switches 1910, 1914, 1918 to drive the motor 1850. At block 2010, the controller 1800 detects release of the trigger 50. For example, the trigger signal from the trigger switch 1858 no longer indicates that the trigger 50 is actuated.

At block 2015, in response to release of the trigger 50, the controller 1800 disengages driving of the motor 1850. For example, the controller 1800 controls the switch 1927 to a non-conducting state to stop providing power to the motor 1850. In some embodiments, by stopping providing power to the motor 1850, the controller 1800 allows the motor 1850 to coast. At block 2020, the controller 1800 determines whether a predetermined time period is satisfied. For example, the controller 1800 allows the motor 1850 to coast for the predetermined time period. The predetermined time period may be, for example, 10 milliseconds, 30 milliseconds, 50 milliseconds, 100 milliseconds, or the like. If the predetermined time period is not satisfied (at block 2020), the controller 1800 continues to allow the motor to coast. If the predetermined time period is satisfied, the controller 1800 proceeds to block 2025.

At block 2025, the controller 1800 initiates braking of the motor 1850. For example, the controller 1800 controls the brake switch 1975 to provide the motor current to the brake resistor 1970. The motor current may be, for example, current resulting from the back-emf of the motor 1850. In some embodiments, the controller 1800 controls the brake switch 1975 using a PWM signal to control a "harshness," or an amount of force resulting from the braking of the motor 1850. For example, the controller 1800 may initially have a low duty cycle (e.g., 50%) to prevent the drive belt 162 from slipping from a sudden braking operation. The braking force is then increased by increasing the duty cycle of the PWM signal used to control the brake switch 1975. For example, the duty cycle may be increased from 50% to 75%. In some embodiments, the duty cycle of the PWM signal is controlled based on a value of the motor current sensed by the current sensor 1875. As the motor current decreases, the duty cycle of the PWM signal is controlled by the controller 1800 to increase the braking force.

Figure 21:
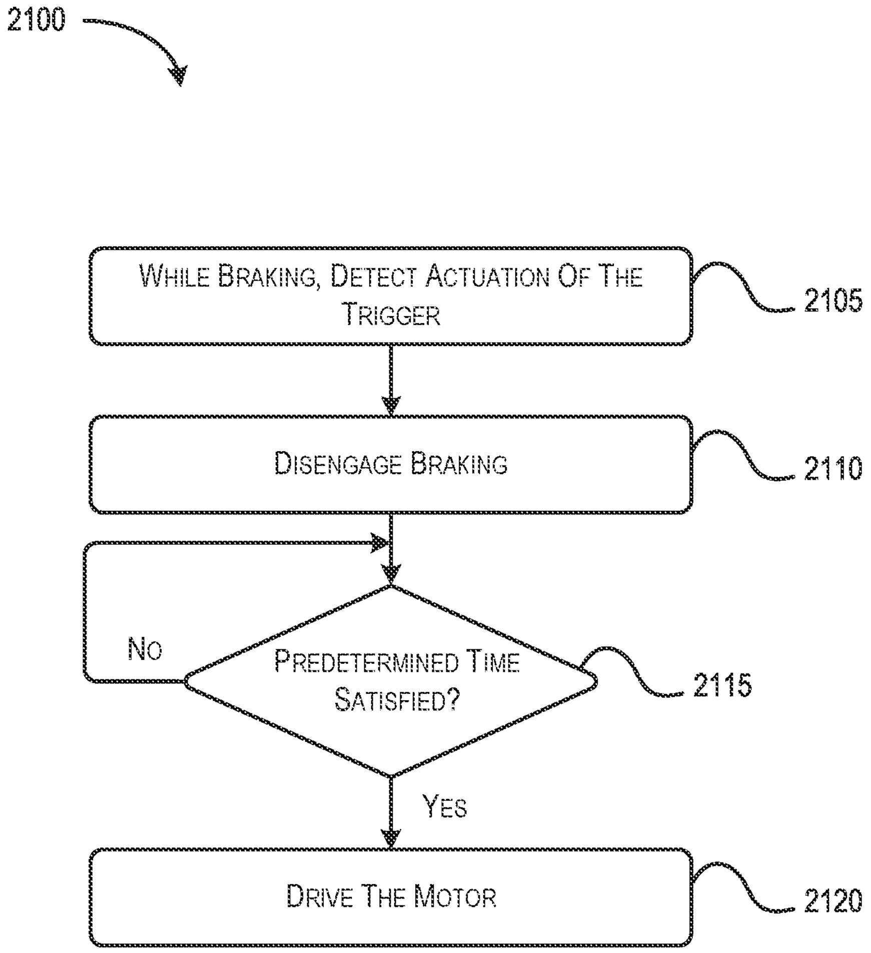
FIG. 21 is a block diagram of another method performed by the controller of FIG. 18, according to embodiments described herein.

In some embodiments, the controller 1800 controls the brake switch 1975 to brake the motor 1850 until the motor 1850 comes to a complete stop. In other embodiments, the controller 1800 detects actuation of the trigger 50 while braking the motor 1850. FIG. 21 illustrates a method 2100 of driving the motor 1850. The method 2100 is performed by the controller 1800. At block 2105, while braking the motor 1850, the controller 1800 detects actuation of the trigger 50. For example, while controlling the brake switch 1975 to brake the motor 1850, the controller 1800 receives a trigger signal from the trigger switch 1858. At block 2110, in response to actuation of the trigger 50, the controller 1800 disengages braking of the motor 1850. For example, the controller 1800 stops controlling the brake switch 1975. Accordingly, the controller 1800 allows the motor 1850 to coast.

At block 2115, the controller 1800 determines whether a predetermined time period has been satisfied. For example, the controller 1800 allows the motor 1850 to coast for the predetermined time period. The predetermined time period may be, for example, 10 milliseconds, 30 milliseconds, 50 milliseconds, 100 milliseconds, or the like. If the predetermined time period is not satisfied (at block 2115), the controller 1800 continues to allow the motor to coast. If the predetermined time period is satisfied, the controller 1800 proceeds to block 2120. At block 2120, the controller 1800 drives the motor 1850.

In some embodiments, the controller 1800 monitors the voltage of each phase of the motor 1850 (e.g., the first phase 1950, the second phase 1952, the third phase 1954) using a resistor divider circuit. Specifically, a resistor divider circuit is situated on each phase node. The controller 1800 monitors the voltage associated with each phase node separately. Based on the voltage provided to the controller 1800, the controller 1800 can determine whether any of the high side electronic switches 1912, 1916, 1920 and/or any of the low side electronic switches 1910, 1914, 1918 are shorted.

Figure 22:
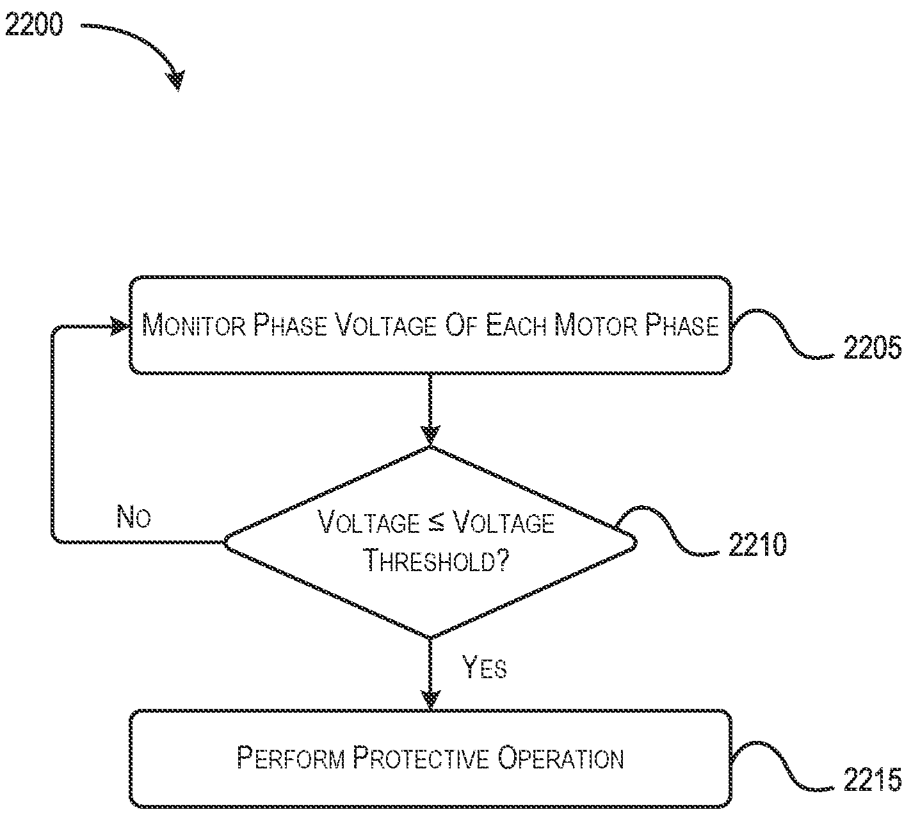
FIG. 22 is a block diagram of another method performed by the controller of FIG. 18, according to embodiments described herein.

FIG. 22 provides a method 2200 for performing a protective operation in response to a shorted motor phase. The method 2200 is performed by the controller 1800. At block 2205, the controller 1800 monitors a phase voltage of each motor phase. As described above, an input of a resistor divider circuit situated on each phase node may provide an input voltage to the controller 1800. In some embodiments, the voltage sensor 1870 provides a voltage signal to the controller 1800 indicative of the phase voltage of each motor phase.

At block 2210, the controller 1800 determines whether the phase voltage of any of the motor phases is less than or equal to a voltage threshold. If the phase voltage of any motor phase is not less than or equal to the voltage threshold, the controller 1800 returns to block 2205 and continues to monitor the phase voltage of each motor phase. If the phase voltage of any motor phase is less than or equal to the voltage threshold, the controller 1800 proceeds to block 2215. At block 2215, the controller 1800 performs a protective operation for the saw 10. As one example, the controller 1800 stops driving or braking of the motor 1850 to stop operation of the saw 10.

Additionally, many heavy-duty power tools (such as concrete saws, jack hammers, lawn mowers, and the like) are powered by gas engines. During operation of gas engine-powered power tools, an excessive input force exerted on the power tool or a large load encountered by the power tool may cause a resistive force impeding further operation of the power tool. For example, a gas engine-powered concrete saw that is pushed too fast or too hard to cut concrete may have its motor slowed or bogged-down because of the excessive load. This bog-down of the motor can be sensed (e.g., felt and heard) by a user, and is a helpful indication that an excessive input, which may potentially damage the power tool, has been encountered. In contrast, high-powered electric motor driven power tools, similar to the saw 10, for example, do not innately provide the bog-down feedback to the user. Rather, in these high-powered electric motor driven power tools, excessive loading of the power tool causes the motor to draw excess current from the power source or battery pack 78. Drawing excess current from the battery pack 78 may cause quick and potentially detrimental depletion of the battery pack 78.

Figure 23A:
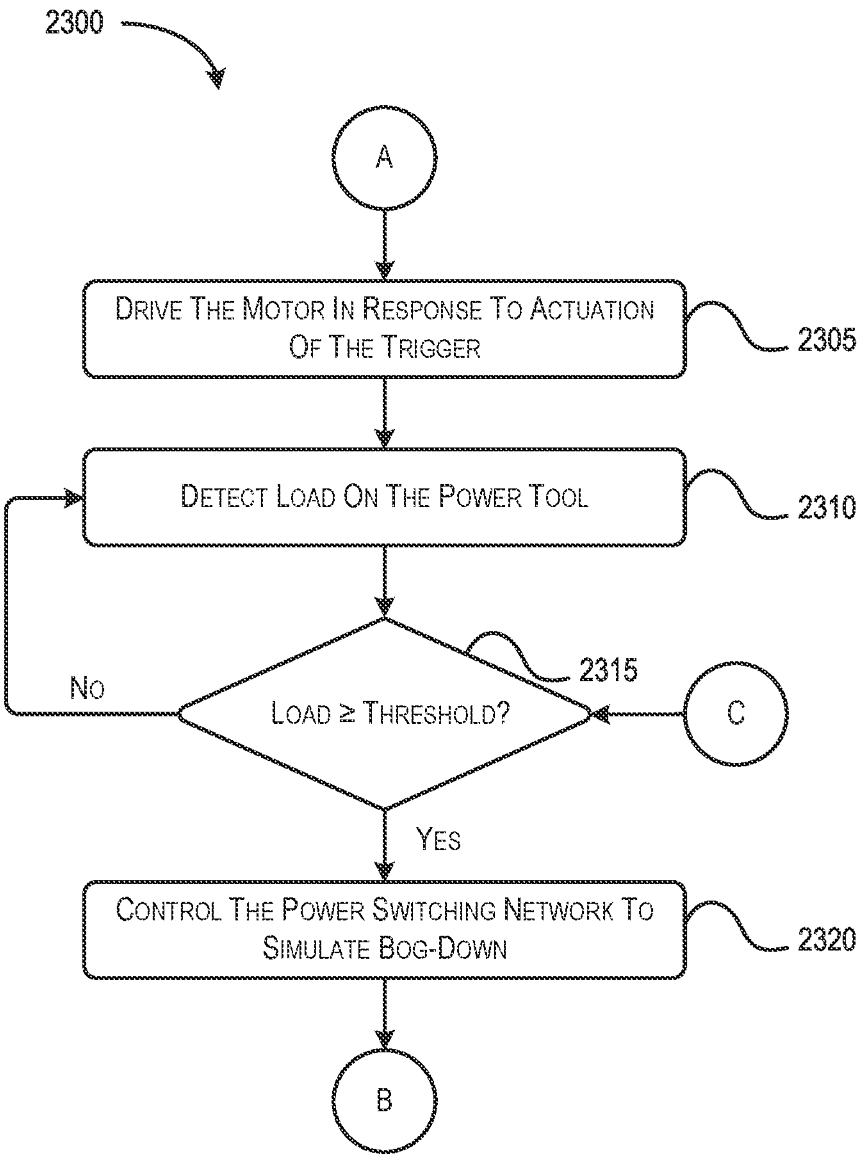
FIG. 23A is a block diagram of another method performed by the controller of FIG. 18, according to embodiments described herein.

Accordingly, in some embodiments, the saw 10 includes a simulated bog-down feature to provide an indication to the user that excessive loading of the saw 10 is occurring during operation (e.g., as detected based on current level of the motor 1850, a torque level of the motor 1850, and/or the like). In some embodiments, the controller 1800 executes a method 2300 as shown in FIG. 23A to provide simulated bog-down operation of the saw 10 that is similar to actual bog-down experienced by gas engine-powered power tools.

At block 2305, the controller 1800 controls the power switching network 1855 to provide power to the motor 1850 in response to determining that the trigger 50 has been actuated. For example, the controller 1800 provides a PWM signal to the FETs of the power switching network 1900 to drive the motor 1850 in accordance with the trigger signal from the trigger 50. At block 2310, the controller 1800 detects a load on the saw 10 (e.g., using the current sensor 1875, a transducer or torque sensor included in the secondary sensors 1880 that monitors the torque of the motor 1850, and/or the like). At block 2315, the controller 1800 compares the load to a threshold (e.g., a load threshold). When the load is not greater than the threshold, the controller 1800 returns to block 2310 such that the controller 1800 repeats blocks 2310 and 2315 until the load is greater than the threshold.

When the controller 1800 determines that the load is greater than the threshold, at block 2320, the controller 1800 controls the power switching network 1855 to simulate bog-down in response to determining that the load is greater than the threshold. In some embodiments, the controller 1800 controls the power switching network 1855 to decrease the speed of the motor 1850 to a non-zero value. For example, the controller 1800 reduces a duty cycle of the PWM signal provided to the FETs of the power switching network 1855. In some embodiments, the reduction in the duty cycle (i.e., the speed of the motor 1850) is proportional to an amount that the load is above the threshold (i.e., an amount of excessive load). In other words, the more excessive the load of the saw 10, the further the speed of the motor 1850 is reduced by the controller 1800. For example, in some embodiments, the controller 1800 determines, in block 2320, the difference between the load of the motor 1850 and the load threshold to determine a difference value. Then, the controller 1800 determines the amount of reduction in the duty cycle based on the difference value (e.g., using a look-up table).

In some embodiments, at block 2320, the controller 1800 controls the power switching network 1855 in a different or additional manner to provide an indication to the user that excessive loading of the saw 10 is occurring during operation. In such embodiments, the behavior of the motor 1850 may provide a more noticeable indication to the user that excessive loading of the saw 10 is occurring than the simulated bog-down described above. As one example, the controller 1800 controls the power switching network 1855 to oscillate between different motor speeds. Such motor control may be similar to a gas engine-powered power tool stalling and may provide haptic feedback to the user to indicate that excessive loading of the saw 10 is occurring. In some embodiments, the controller 1800 controls the power switching network 1855 to oscillate between different motor speeds to provide an indication to the user that very excessive loading of the saw 10 is occurring. For example, the controller 1800 controls the power switching network 1855 to oscillate between different motor speeds in response to determining that the load of the saw 10 is greater than a second threshold that is greater than the threshold described above with respect to simulated bog-down. As another example, the controller 1800 controls the power switching network 1855 to oscillate between different motor speeds in response to determining that the load of the saw 10 has been greater than the threshold described above with respect to simulated bog-down for a predetermined time (e.g., two seconds). In other words, the controller 1800 may control the power switching network 1855 to simulate bog-down when excessive loading of the saw 10 is detected and may control the power switching network 1855 to simulate stalling when excessive loading is prolonged or increases beyond a second threshold.

With respect to any of the embodiments described above with respect to block 2320, other characteristics of the saw 10 and the motor 1850 may provide indications to the user that excessive loading of the saw 10 is occurring (e.g., tool vibration, resonant sound of a shaft of the motor 1850, and sound of the motor 1850). In some embodiments, these characteristics change as the controller 1800 controls the power switching network 1855 to simulate bog-down or to oscillate between different motor speeds as described above.

Figure 23B:
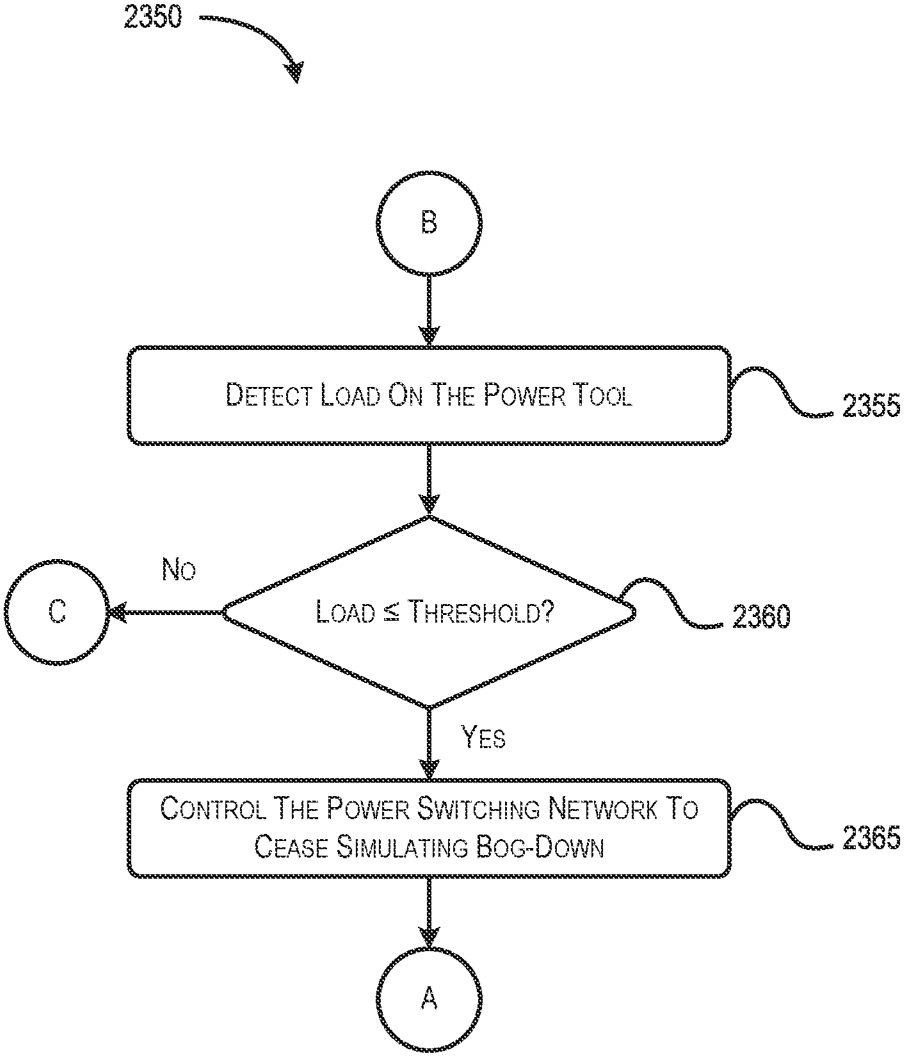
FIG. 23B is a block diagram of another method performed by the controller of FIG. 18, according to embodiments described herein.

In some embodiments, after the controller 1800 controls the power switching network 1855 to simulate bog-down (at block 2320), the controller 1800 executes a method 2350 as shown in FIG. 23B. At block 2355, which is similar to block 2310, the controller 1800 detects the load on the saw 10. At block 2360, the controller 1800 compares the load on the saw 10 to the threshold. For example, the controller 1800 compares the motor current to a threshold. When the load remains above the threshold, the controller 1800 proceeds back to block 2315 such that the controller 1800 repeats blocks 2315 through 2360 until the load decreases below the threshold. In other words, the controller 1800 continues to simulate bog-down until the load decreases below the threshold. Repetition of blocks 2315 through 2360 allows the controller 1800 to simulate bog-down differently as the load changes but remains above the threshold (e.g., as mentioned previously regarding proportional adjustment of the duty cycle of the PWM provided to the FETs).

When the load on the saw 10 decreases below the threshold (e.g., in response to the user pulling the saw 10 away from a work surface), the controller 1800 controls the power switching network 1855 to cease simulating bog-down and operate in accordance with the actuation of the trigger 50 (block 2365). In other words, the controller 1800 controls the power switching network 1855 to increase the speed of the motor 1850 from the reduced simulated bog-down speed to a speed corresponding to the trigger signal from the trigger 50. For example, the controller 1800 increases the duty cycle of the PWM signal provided to the FETs of the power switching network 1855. In some embodiments, the controller 1800 gradually ramps the speed of the motor 1850 up from the reduced simulated bog-down speed to the speed corresponding to the trigger signal from the trigger 50. The controller 1800 then returns to block 2305 to allow the controller 1800 to continue to monitor the saw 10 for excessive load conditions. Although not shown in FIGS. 23A and 23B, as indicated by the above description of the trigger 50, during execution of any block in the methods 2300 and 2350, the controller 1800 may cease providing power to the motor 1850 in response to determining that the trigger 50 is no longer actuated (i.e., has been released by the user) or may provide power to the motor 1850 to cause the motor 1850 to stop rotating (e.g., braking).

In some embodiments, while simulating bog-down at block 2320, the load on the saw (indicated by the motor current) may continue to increase rather than decreasing below the load threshold. Accordingly, while simulating bog-down, the controller 1800 may compare the load to a second threshold. Should the load exceed the second threshold (e.g., the motor current becomes greater than the second threshold), the controller 1800 performs a protective operation to stop driving the motor 1850. The second threshold may be, for example, 60 amps, 70 amps, amps, or the like.

Figure 24:
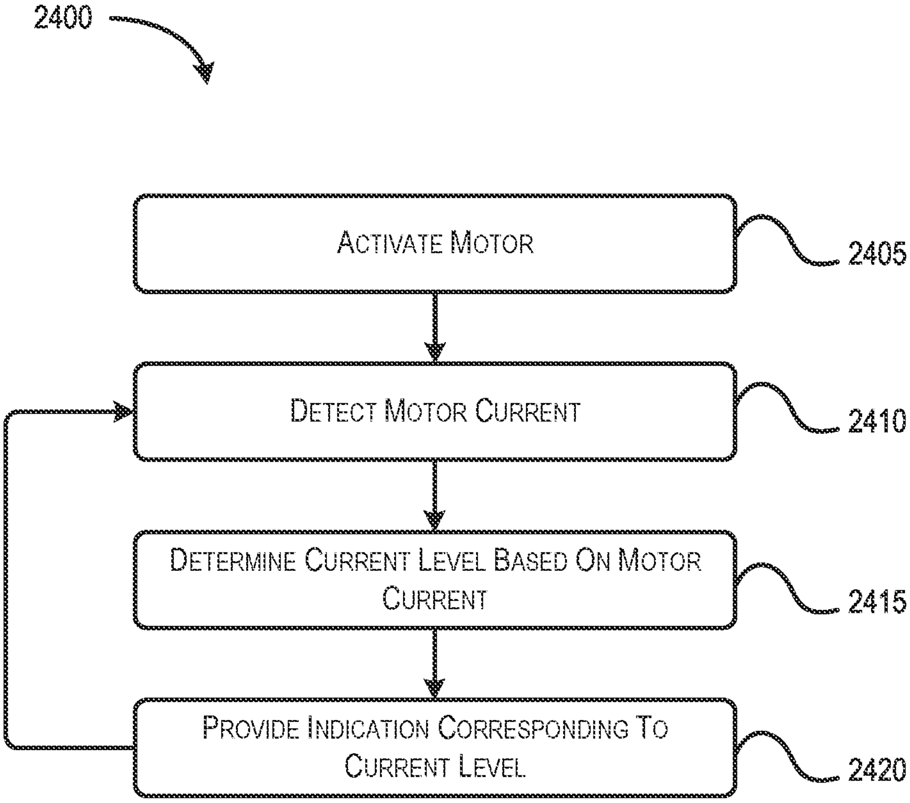
FIG. 24 is a block diagram of another method performed by the controller of FIG. 18, according to embodiments described herein.

The indicators 1845 may be configured to provide information related to performance of the saw 10. FIG. 24 provides a method 2400 for providing a performance indication for the saw 10. The method 2400 is performed by the controller 1800. At block 2405, the controller 1800 activates the motor 1850. The motor 1850 may be activated in response to the user depressing the trigger 50 of the saw 10, which prompts the controller 1800 to control the power switching network 1855 to provide power to the motor 1850.

At block 2410, the controller 1800 detects, with the current sensor 1875, a motor current. At block 2415, the controller 1800 determines a current level based on the motor current. For example, the controller 1800 compares the detected motor current to a range of motor current thresholds to determine the current level. As one example, the motor current thresholds are 20%, 40%, 60%, 80%, and 100% of maximum allowable motor current. The maximum allowable motor current may be a maximum current that the battery pack 78 can discharge without damaging the battery pack 78 or the saw 10. This maximum battery current may be picked as the maximum allowable motor current.

In some embodiments, the amount of expected motor current may vary based on the voltage of the battery pack 78. In these embodiments, the controller 1800 may use a battery pack voltage measurement to weigh the measured current values. For example, when the battery pack 78 has a first, higher voltage (e.g., when fully charged), the expected motor current may be higher than when the battery pack 78 has a second, lower voltage (e.g., after the battery pack 78 is partially drained through usage of the saw 10). Accordingly, the controller 1800 may determine the battery voltage at block 2410, and weight the detected current by multiplying the detected current by a value inversely proportional to the voltage of the battery pack 78. Thus, in some embodiments, the detected motor current in block 2410 is an adjusted current weighted based on the voltage of the battery pack 78. Alternatively, in another embodiment, the voltage of the battery pack 78 is used to adjust the motor current thresholds. For example, the motor current thresholds are multiplied by a value inversely proportional to the voltage of the battery pack 78. In the foregoing description, the term "motor current" is used to describe both the detected motor current and the adjusted motor current. Similarly, the term "motor current thresholds" is used to describe both the motor current thresholds and the adjusted motor current thresholds.

As described above, the controller 1800 determines the current level by comparing the motor current to the motor current thresholds. For example, when the motor current is below the 20% motor current threshold, the controller 1800 determines that the motor current is at "current level 1." When the motor current is above the 20% current threshold but below the 40% motor current threshold, the controller 1800 determines that the motor current is at "current level 2." Similarly, motor current between 40% and 60% motor current thresholds correspond to "current level 3," motor current between 60% and 80% motor current thresholds corresponds to "current level 4," motor current between 80% and 90% motor current thresholds correspond to 'current level 5," motor current between 90% and 100% motor current thresholds correspond to "current level 6," and motor current above 100% motor current threshold corresponds to "current level 7." In some embodiments, other linear or non-linear thresholds are used for the current levels and may include additional or fewer current levels than provided above.

Figure 26:
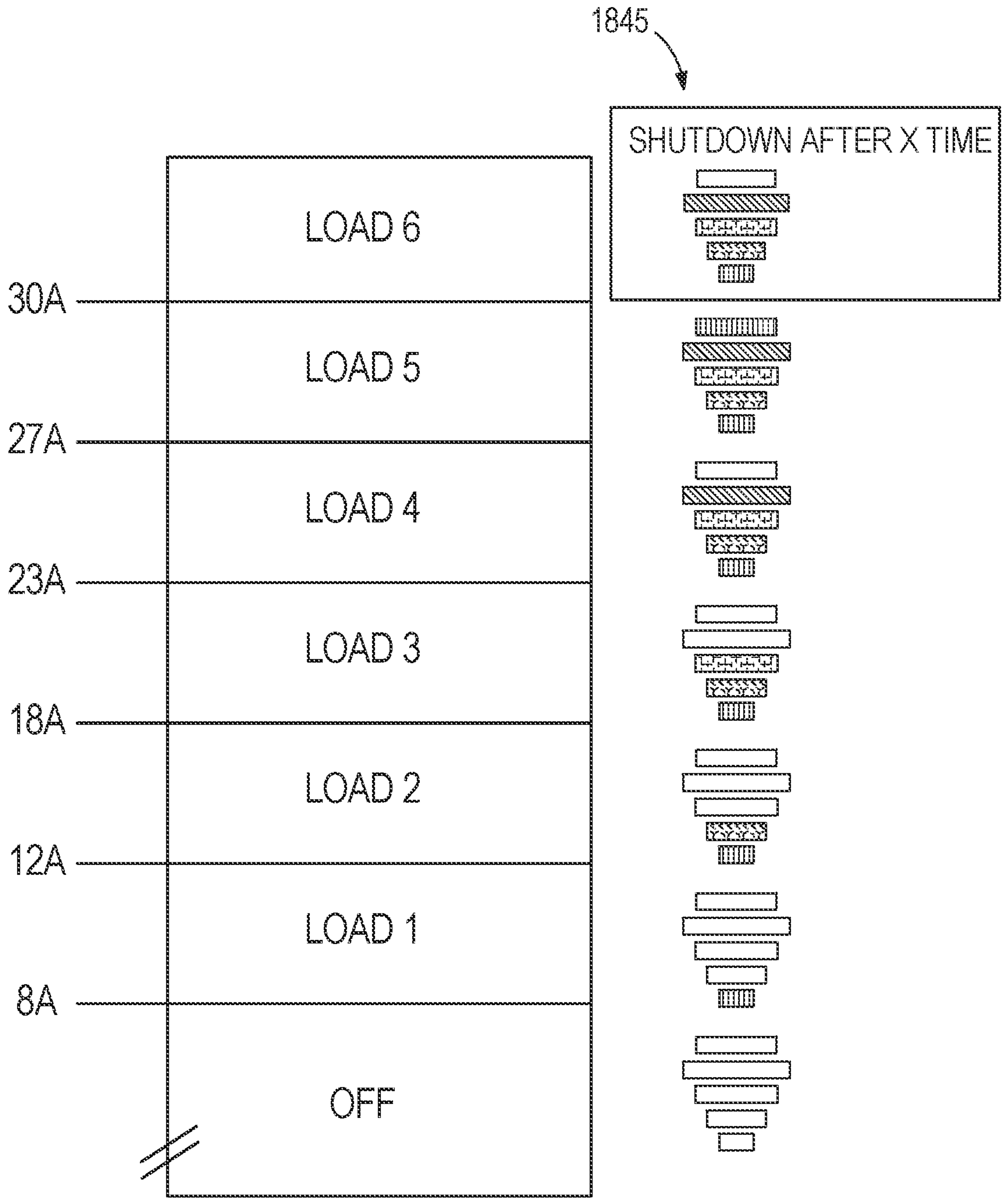
FIG. 26 is a diagram of an indicator indicating various motor current levels, according to embodiments described herein.

At block 2420, the controller 1800 controls the indicators 1845 to provide an indication corresponding to the current level. In one embodiment, a look-up table may be stored in the memory 1825 that maps the current level to an indication. For example, FIG. 26 illustrates a lighting sequence of indicators 1845 configured as a plurality of LED bars. The controller 1800 provides control signals to the LED bars based on the indication corresponding to the current level. In another embodiment, the indicators 1845 include a single LED configured to provide an indication of the motor current. To indicate the motor current through the single LED, the controller 1800 may vary a brightness of the LED (e.g., a dull light corresponding to a motor current between 20% and 40% motor current thresholds and a bright light corresponding to a motor current between 90% and 100% motor current thresholds), may vary a color of the LED (e.g., a green light corresponding to a motor current between 20% and 40% motor current thresholds and a red light corresponding to a motor current between 90% and 100% motor current thresholds), and the like. After providing the indication, the controller 1800 returns to detecting the next instance of motor current and repeats the blocks 2410, 2415, 2420 until an input is detected to deactivate the motor 1850 (e.g., releasing the trigger 50).

Figure 25:
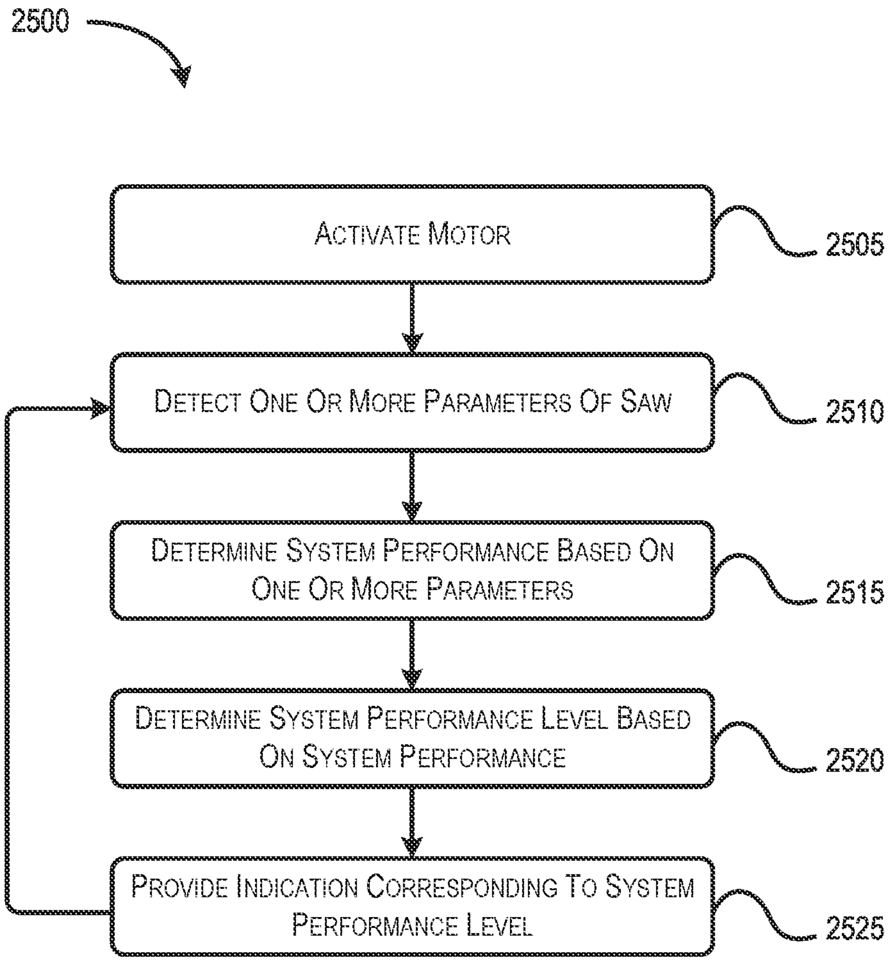
FIG. 25 is a block diagram of another method performed by the controller of FIG. 18, according to embodiments described herein.

FIG. 25 provides a flowchart illustrating an example method 2500 for providing a performance indication of the saw 10. The method 2500 is performed by the controller 1800. At block 2505, the controller 1800 activates the motor 1850. As described above, the motor 1850 may be activated in response to the user depressing the trigger 50.

At block 2510, the controller 1800 detects one or more parameters of at least one of the battery pack 78 and the saw 10. For example, the controller 1800 communicates with a microprocessor of the battery pack 78 to determine a state of charge, a temperature, and the like of the battery pack 78. Additionally, the controller 1800 may detect a temperature, a pressure, a torque, and the like of the saw 10 using the secondary sensors 1880. At block 2515, the controller 1800 determines a system performance based on the one or more parameters. The controller 1800 may use known techniques to determine system performance by providing different weights to the one or more parameters and combining the weighted parameters. System performance may be modeled after industry standard benchmarks that combine the one or more parameters detected to predict the life of the saw 10.

At block 2520, the controller 1800 determines a system performance level based on the system performance. For example, the controller 1800 compares the system performance to a range of system performance thresholds to determine the system performance level. In one example, the system performance thresholds are 20%, 40%, 60%, 80%, and 100% of maximum allowable system performance. The maximum allowable system performance may be a maximum value of weighted parameters that the saw 10 can operate at without damaging the battery pack 78 or the saw 10. The manufacturer may provide a maximum system performance that allows for safe operation. This maximum safe system performance may be picked as the maximum allowable system performance. In another example, the maximum allowable system performance may be a user-defined system performance level. The user may provide an input to the saw 10 defining the system performance level. In response to the user input, the saw 10 stores the user-defined system performance level as the maximum allowable system performance.

As described above, the controller 1800 determines the system performance level by comparing the motor current to the motor current thresholds. For example, when the system performance is below the 20% system performance threshold (that is, the system performance does not satisfy a first system performance threshold), the controller 1800 determines that the system performance is at "performance level 1." When the system performance is above the 20% system performance threshold but below the 40% system performance threshold (that is, the system performance satisfies the first system performance threshold and does not satisfy a second system performance threshold), the controller 1800 determines that the motor current is at "performance level 2." Similarly, system performance between 40% and 60% system performance thresholds corresponds to "performance level 3," system performance between 60% and 80% system performance thresholds corresponds to "performance level 4," system performance between 80% and 90% system performance thresholds corresponds to "performance level 5," system performance between 90% and 100% system performance thresholds corresponds to "performance level 6," and system performance above 100% system performance threshold corresponds to "performance level 7." In some embodiments, other linear or non-linear thresholds are used for the system performance levels and may include additional or fewer system performance levels than provided above. Additionally, the system performance levels may be defined by a user of the saw 10. For example, the user may provide inputs to the saw 10 defining the various system performances that correspond to the system performance levels as described.

Figure 27:
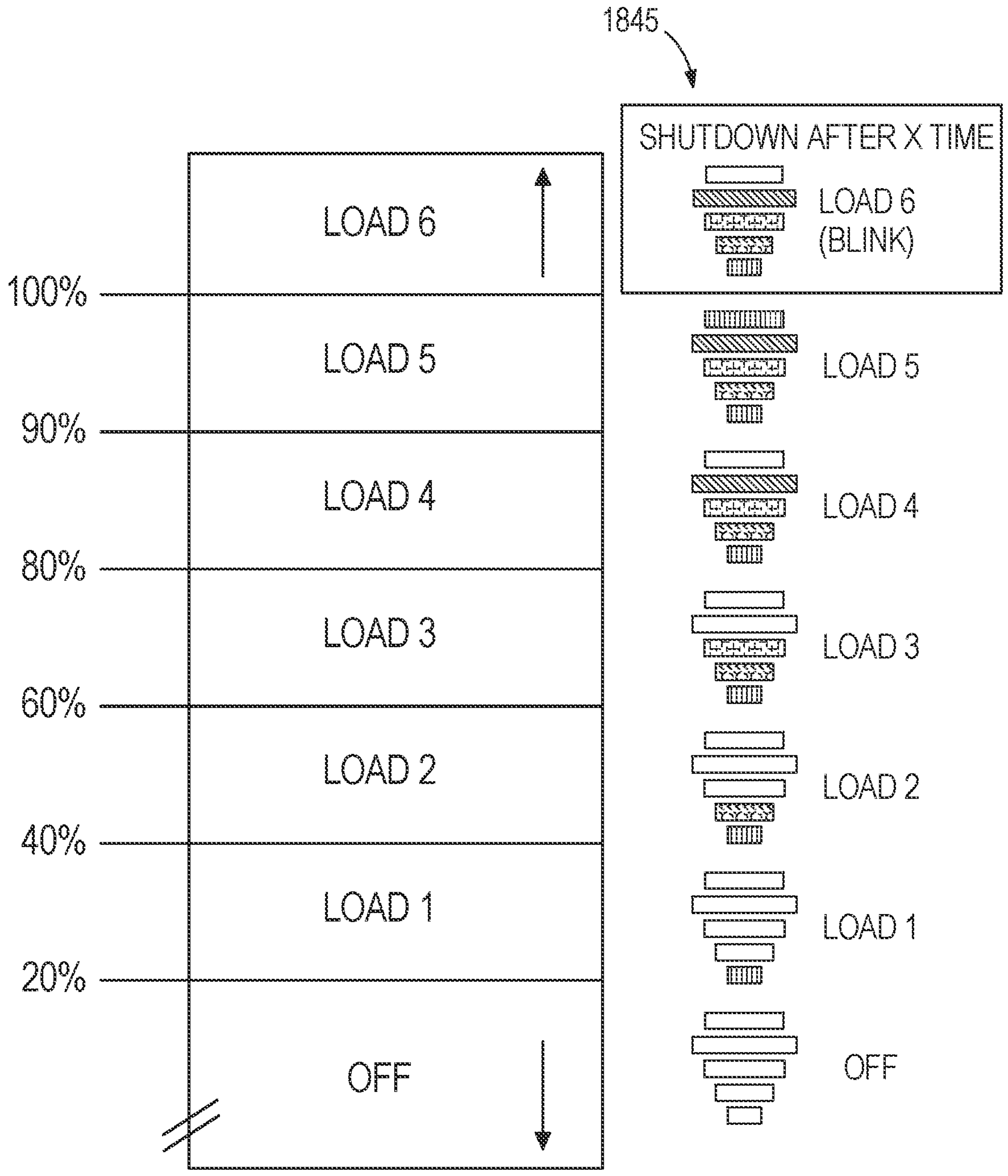
FIG. 27 is a diagram of an indicator indicating various system performance levels, according to embodiments described herein.

At block 2525, the controller 1800 provides an indication corresponding to the system performance level. In one embodiment, a look-up table may be stored in the memory 1825 that maps the performance level to indication. For example, FIG. 27 illustrates a lighting sequence of indicators 1845 configured as a plurality of LED bars. The controller 1800 provides control signals to the LED bars based on the indication corresponding to the system performance level. In another embodiment, the indicators 1845 include a single LED configured to provide an indication of the system performance. To indicate the system performance through the single LED, the controller 1800 may vary a brightness of the LED (e.g., a dull light corresponding to a system performance between 20% and 40% system performance thresholds and a bright light corresponding to a system performance between 90% and 100% system performance thresholds), may vary a color of the LED (e.g., a red light corresponding to a system performance between 20% and 40% system performance thresholds and a green light corresponding to a system performance between 90% and 100% system performance thresholds), and the like. After providing the indication, the controller 1800 returns to detecting the next instance of motor current and repeats the blocks 2510, 2515, 2520, 2525 until an input is detected to deactivate the motor 1850 (e.g., releasing the trigger 50).

Although the invention has been described in detail with reference to certain preferred embodiments, variations and modifications exist within the scope and spirit of one or more independent aspects of the invention as described.

Various features of the invention are set forth in the following claims.

What is claimed is:

1. A power tool comprising:

a housing;

a trigger;

a motor supported within the housing;

a saw blade interconnected to the housing by a support arm and drivably coupled to the motor;

a main handle integrally formed with the housing;

an auxiliary handle coupled to the housing and disposed between the saw blade and the main handle;

a battery receptacle defined by the housing and positioned beneath the main handle, the battery receptacle includes a first wall parallel to a surface of the housing and a second wall obliquely oriented relative to the first wall, the battery receptacle configured to receive a battery pack to supply electrical current to the motor;

a splash guard integrally formed with the housing and positioned between the battery receptacle and the saw blade, the splash guard extends in a direction opposite the support arm and at least partially defines the battery receptacle;

at least one foot extending from the splash guard; and a pair of wheels supported by respective wheel mounts, wherein the at least one foot and the pair of wheels are configured to support the power tool along a surface such that the at least one foot and the pair of wheels define a reference plane, and wherein the first wall of the battery receptacle and a longitudinal axis defined by the support arm are arranged obliquely relative the reference plane.

2. The power tool of claim 1, wherein the at least one foot is a first foot, and further comprising a second foot extending from the splash guard.

3. The power tool of claim 1, wherein the first wall defines a first oblique angle relative to the longitudinal axis defined by the support arm, and wherein the second wall defines a second oblique angle relative to the longitudinal axis of the support arm.

4. The power tool of claim 3, wherein the first oblique angle is 140 degrees, and wherein the second oblique angle is 80 degrees.

5. The power tool of claim 1, wherein the first wall is obliquely oriented relative to a handle axis defined by the main handle.

6. The power tool of claim 5, wherein the first wall defines an angle of 34 degrees relative to the handle axis.

7. The power tool of claim 1, wherein the saw blade defines an origin point at a center of the saw blade, and wherein a center of gravity of the power tool is located rearward of the origin point.

8. The power tool of claim 1, wherein the battery receptacle is configured to support the battery pack such that the battery pack is oriented in an oblique orientation relative to the reference plane.

9. The power tool of claim 1, wherein the main handle extends from a rear portion of the housing in the direction opposite the support arm.

10. The power tool of claim 1, further comprising a drive assembly configured to drivably couple the saw blade to the motor, the drive assembly including a drive pulley fixed to an output shaft of the motor, a driven pulley drivably coupled to the drive pulley by a belt, a spindle fixed to the driven pulley, and a clamp assembly configured to secure the saw blade to the spindle.

* * * * *